(12) United States Patent
Cheatle

(10) Patent No.: US 7,133,571 B2
(45) Date of Patent: Nov. 7, 2006

(54) AUTOMATED CROPPING OF ELECTRONIC IMAGES

(75) Inventor: Stephen Philip Cheatle, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 917 days.

(21) Appl. No.: 10/169,841

(22) PCT Filed: Dec. 20, 2001

(86) PCT No.: PCT/GB01/05683

§ 371 (c)(1),
(2), (4) Date: Jul. 10, 2002

(87) PCT Pub. No.: WO02/052835

PCT Pub. Date: Jul. 4, 2002

(65) Prior Publication Data

US 2002/0191861 A1  Dec. 19, 2002

(30) Foreign Application Priority Data

Dec. 22, 2000 (GB) ................................ 0031423.7

(51) Int. Cl.
*G06K 9/20* (2006.01)
(52) U.S. Cl. ...................................... 382/282; 382/173
(58) Field of Classification Search ................ 382/282
See application file for complete search history.

(56) References Cited

U.S. PATENT DOCUMENTS

| | | | |
|---|---|---|---|
| 3,956,758 A | 5/1976 | Numata et al. | 382/203 |
| 4,317,620 A | 3/1982 | Coppa et al. | 358/1.6 |
| 4,384,336 A | 5/1983 | Frankle et al. | 250/559.29 |
| 4,423,936 A | 1/1984 | Johnson | 396/190 |

(Continued)

FOREIGN PATENT DOCUMENTS

EP  0 456 414 A2  11/1991

(Continued)

OTHER PUBLICATIONS

Teruo, "Foreground Picture Extracting Method, Picture Processor, Automatic Trimming Device, Recording Medium and Portrait Picture Device," *Patent Abstracts of Japan*, vol. 2000, No. 05, Sep. 14, 2000, JP 2000-036032, Feb. 2, 2000, Abstract.

(Continued)

*Primary Examiner*—Daniel Miriam
*Assistant Examiner*—Dennis Rosario
(74) *Attorney, Agent, or Firm*—Foley & Lardner LLP

(57) ABSTRACT

The present invention relates to the automated and semi-automated cropping of electronic images, and in particular to an apparatus and a method of using an electronic camera to capture and crop such electronic images. An electronic imaging processing device (1) for cropping an electronic image comprises an image processing means (6,8), the image processing means including an electronic processor (6) and firmware and/or software for processing the electronic image. The device (1) processes the electronic image to identify one or more features relevant to the composition of the electronic image, each such feature having one or more compositionally significant properties from amongst a plurality of different predetermined compositional properties, and each such feature occupying a sub-region of the electronic image. Then the device (1) selects one or more compositional rules from a set of predetermined compositional rules, based on the relevance of the compositional rule(s) to the compositionally significant properties of one or more of the identified features. Then the device (1) determines one or more suitable crop boundaries by applying one or more of the selected compositional rules.

41 Claims, 19 Drawing Sheets

U.S. PATENT DOCUMENTS

| | | | |
|---|---|---|---|
| 4,541,704 A | 9/1985 | Freeman | 348/208.6 |
| 4,605,970 A | 8/1986 | Hawkins | 396/123 |
| 4,724,330 A | 2/1988 | Tuhro | 382/302 |
| 5,091,654 A | 2/1992 | Coy et al. | 358/406 |
| 5,227,889 A | 7/1993 | Yoneyama et al. | 348/254 |
| 5,345,284 A | 9/1994 | Tsuruta | 356/614 |
| 5,384,615 A | 1/1995 | Hsieh et al. | 382/282 |
| 5,486,893 A | 1/1996 | Takagi | 396/281 |
| 5,500,711 A | 3/1996 | Sasagaki et al. | 396/287 |
| 5,511,148 A | 4/1996 | Wellner | 396/161 |
| 5,517,242 A | 5/1996 | Yamada et al. | 348/211.4 |
| 5,666,186 A | 9/1997 | Meyerhoefer et al. | 396/147 |
| 5,900,909 A | 5/1999 | Parulski et al. | 348/231.6 |
| 5,978,519 A | 11/1999 | Bollman et al. | 396/84 |
| 6,067,112 A | 5/2000 | Wellner et al. | 396/234 |
| 6,289,110 B1 * | 9/2001 | Kim et al. | 382/103 |
| 6,556,721 B1 * | 4/2003 | Wang et al. | 382/282 |
| 6,671,405 B1 * | 12/2003 | Savakis et al. | 382/203 |
| 6,686,970 B1 * | 2/2004 | Windle | 348/584 |
| 6,728,407 B1 * | 4/2004 | Horiuchi et al. | 382/199 |
| 6,813,395 B1 * | 11/2004 | Kinjo | 382/305 |
| 2002/0028071 A1 | 3/2002 | Molgaard | 396/53 |
| 2002/0114535 A1 | 8/2002 | Luo | 382/282 |
| 2002/0152291 A1 * | 10/2002 | Fernandez et al. | 709/222 |
| 2002/0191860 A1 * | 12/2002 | Cheatle | 382/282 |

FOREIGN PATENT DOCUMENTS

| | | |
|---|---|---|
| EP | 0 595 299 | 5/1994 |
| EP | 0 824 246 | 2/1998 |
| EP | 0 912 047 | 4/1999 |
| EP | 0 924 923 | 6/1999 |
| EP | 0 949 802 | 10/1999 |
| EP | 1 158 464 A1 | 11/2001 |
| GB | 2 124 055 | 2/1984 |
| GB | 2 350 251 | 11/2000 |
| JP | 6-059430 | 3/1994 |
| JP | 2000-244800 | 9/2000 |
| JP | 2001-148843 | 5/2001 |
| WO | WO 95/32581 | 11/1995 |
| WO | WO 99/03264 | 1/1999 |
| WO | WO 99/09887 | 3/1999 |
| WO | WO 00/38417 | 6/2000 |
| WO | WO 03/012678 A2 | 2/2003 |

OTHER PUBLICATIONS

K. Hachimura et al., "Image Retrieval Based on Compositional Features and Interactive Query Specification", *IEEE*, Sep. 3, 2000, pp. 262-266.

C. Ordonez et al., "Discovering Association Rules Based on Image Content", *IEEE*, May 19, 1999, pp. 38-49.

* cited by examiner

AUTOMATED CROPPING OF ELECTRONIC IMAGES

The present invention relates to the automated and semi-automated cropping of electronic images, and in particular to an apparatus and a method of using an electronic camera to capture and crop such electronic images.

Conventional photography requires the photographer to use a viewfinder both to aim the camera and to compose the picture. Composition at a particular location is done by changing the direction of the camera and altering the zoom control. Careful composition takes time and attention, as well as an understanding of various rules of good photographic composition. This is a skill that many find hard to learn. The effort required causes the photographer to be "out of the event" and in many cases this problem is enough to prevent potentially pleasing photographs from being taken. This is particularly the case when a photograph has to be taken quickly, for example when photographing action events, or children. Although, in principle, a photograph can be cropped after the event, this is time consuming and inconvenient, and may still require knowledge of the rules of good photographic composition, which the photographer may not possess.

U.S. Pat. No. 5,978,519 discloses an automatic cropping apparatus for cropping very specific images, and in particular "portrait" photographs where an individual is positioned in front of a uniform background. Under these relatively well defined conditions the system disclosed in U.S. Pat. No. 5,978,519 firstly converts the input image from RGB colour space into luminance space. The image is then scaled to fit a grid of 256×256 pixels which itself is subdivided into blocks of 4×4 pixels.

Next, the mean and variance of the intensity level is calculated for each block of pixels and a variance profile of the image is calculated. Because the background is plain, it can be expected that most blocks within the image will exhibit little variance. A threshold is calculated from the variance curve, the threshold corresponding to the "knee" of the curve. All blocks which are of interest are then cropped by bounding them by a rectangle which is selected as the minimum size of rectangle (and hence crop) into which the regions of interest fit. In one embodiment of the invention disclosed in '519 this minimum crop is then increased by 1% to define a boarder.

A post processing procedure may then be performed to remove the "noise" within the crop boundary. Thus, as described in '519, "small glitches and spots are eliminated, thereby providing a better bounding rectangle, especially at the edges of the autocropping image".

Thus, although this prior art system does perform automatic cropping of images, it does so only on images where it has a prior knowledge that the background is plain and on the assumption that there is only one subject—and hence it always generates a crop boundary to frame the one subject. This technique is not really suited to "real world" images where more complex scenes are captured, where there may be one or more competing subjects or where, to obtain an aesthetically pleasing result, a crop larger than the minimum crop able to frame the subject may be required.

According to a first aspect of the present invention, there is provided an electronic image processing device for cropping an electronic image, comprising an image processor, wherein the device is adapted to:

a) process the electronic image to identify one or more features relevant to the composition of the electronic image, each such feature occupying a sub-region of the electronic image;

b) select at least one compositional rule from a plurality of predetermined compositional rules, based on the relevance of the compositional rule(s) to one or more of the identified features; and c) determine one or more suitable crop boundaries by applying one or more of the selected compositional rules.

It is thus possible to provide a more convenient apparatus and method for capturing and cropping electronic images.

Also according to the invention, there is provided a method of using an electronic image processing device for cropping an electronic image, the image processing device comprising an image processing means, the image processing means including an electronic processor and firmware and/or software for processing the electronic image, wherein the method comprises the steps of using the image processing means to:

i) process the electronic image to identify one or more features relevant to the composition of the electronic image each such feature occupying a sub-region of the electronic image;

ii) select one or more compositional rules from a set containing a plurality of predetermined compositional rules, based on the relevance of the compositional rule(s) to one or more of the identified features; and iii) determine one or more suitable crop boundaries by applying one or more of the selected compositional rules.

Preferably each identified feature has one or more compositionally significant properties from amongst a plurality of different predetermined compositional properties. Advantageously one or more compositional rules are selected from a set of predetermined compositional rules, based on the relevance of the compositional rule(s) to the compositionally significant properties of one or more of the identified features.

The image may be cropped automatically by the image processing means according to a measure of the quality of the potential crop boundaries. Alternatively, a plurality of automatically calculated croppings may be presented to a user, and the user may manually select amongst the potential crop boundaries, so that the cropping of the image is performed semiautomatically.

Compositionally significant properties of a feature include things like the type of feature, e.g. a blank area, an area of relatively high contrast or colour or texture, recognisable objects such as a face, the sky or an edge or the horizon. Thus, a "feature of compositional significance" in the image may be the absence of an object in a portion of the image,—ie a blank area.

The electronic imaging system may be part of an electronic camera, or a document imaging system, or any other image capture system where the captured image may be cropped.

The electronic imaging system may be used with an electronic camera system for capturing an electronic image of a scene. In particular, the electronic imaging system may be incorporated with the electronic camera Alternatively, the system may comprise a conventional electronic camera that outputs captured images to an image processing device, for example a personal computer, or other data processing device, that includes the image processing means.

The camera will, in general, comprise a detector array for capturing the electronic image and an optical imaging system arranged to image the scene onto the detector array. The camera may be a hand-held still electronic camera and/or a video electronic camera.

A first compositional rule may comprise edge placement criteria, for example having a dark border to an edge of the cropped image. A further compositional rule may seek to place an edge one-third or two-thirds the way from an area of interest within the crop boundary.

It may be that just one compositional rule is used multiple times on a single image, once for each identified feature.

Once candidate crop boundaries have been determined, these may be presented to a user of the system. The user may then choose a cropping candidate, whereupon the image processing device may be arranged to crop the electronic image according to the user's choice.

The identifiable features should be those features that are relevant to the placement of cropping boundaries in the processed image.

The camera may include means by which a user of the camera may tag one or more features relevant to the composition of the electronic image, said tagged feature(s) then being associated with a compositional rule that includes said tagged feature(s) in the cropped image. Such tagging may be done by the user indicating by means of suitable controls a feature or an area of the captured image as displayed to the user, for example on a LCD display built into the camera.

It may be possible, however, for features in the image to be tagged automatically. For example, a person in view of the camera may wear some sort of identifier tag which can be recognised automatically by the image processing means within the camera. The tag may be an optically distinguishable badge pattern understood by the image processing software. A person can then be automatically identified.

Optionally therefore, the identifiable features may include a predetermined feature, for example a tag that a person may wear. Such a tag may have an identifiable pattern which the image processing system recognises. At least one compositional rule will then be associated with such an identified tag so that the identified feature is included in the cropped image. So that the tag does not distract a user viewing the cropped image, it is preferable if it is implemented as an infra-red only tag (for example, as an infra-red transmitter).

One way of manually tagging features is to use the camera viewfinder as a pointing device (as opposed to its conventional use as both a pointing and composition device). In this use the prime area of interest is deliberately positioned in the approximate centre of the frame. When the image is auto-cropped according to this invention, the region at the centre of the image is deemed to be essential to the cropped image and is thus prevented from being cropped out.

In another embodiment of the invention, prior to identifying in the captured image any features, the electronic camera may be used to capture an image of an object with an appearance corresponding to a feature to be included in the cropped image. This may relate to the appearance of the object (or the person—for example, a face) itself; but in a different use model may also relate to appendages worn for the purpose of identification. For example, if a person is wearing a jacket of a particular shade of blue, then the electronic camera may be pointed at the jacket in order to "initialise" the image processing means to recognise that shade of blue as being associated with a tagged feature when that shade of blue is captured in an electronic image. This may be assigned a high interest metric and/or may be associated with a particular compositional rule. When an image is captured, the image processing means may then be used to identify in the captured image at least one tagged feature. Then, the compositional rules may be used to crop the captured image so that the tagged feature is included in the cropped image.

In one embodiment of the invention, step iii) comprises the steps of:

iv) generating a plurality of alternative candidate crop boundaries;

v) generating a measure of composition quality for each alternative candidate crop boundary by using a set of picture composition metrics; and vi) selecting as an output a reduced number of crop candidates having a relatively high measure of composition quality, for example, just one crop candidate.

In an alternative embodiment of the invention, step (iii) comprises the steps of:

vii) implementing the compositional rules as constraints that may be satisfied to a greater or lesser degree, each constraint having an associated cost function that increases the less well the constraint is satisfied.

viii) defining an overall cost metric as a function of crop coordinates in the image, by forming a combination of the separate cost functions associated with each individual constraint;

ix) applying an optimisation method to find one or more best crop locations by finding minima in the overall cost metric; and x) selecting as output a reduced number of crop candidates for said best crop locations, for example, just one crop candidate.

There will be at least one crop edge. For example a circle or an ellipse has just one crop edge. Often there will be more than one crop edge, for example a square or a rectangle has four edges, between one and four of which will result from cropping of the original electronic image.

When the crop boundary of the cropped image has a plurality of crop edges, the steps of the method may be performed separately for each crop edge to generate the crop boundary. This helps to reduce the calculation needed to select the crop boundaries, as each edge may be assessed independently from the other edges. However, if the user seeks to apply some aspect ratio constraints then the amount of computation may be reduced. Thus, if for example, the user defines that the aspect ratio will be exactly A:B, where A and B are numbers, such as 4 and 3, then once three crop boundaries are known then the position of the final boundary is fixed.

One way in which the invention may be implemented is if step (i) described above includes the step of identifying features which constitute non-overlapping segmented regions of interest. Then step (iii) may be achieved by first selecting alternative divisions of said identified regions of interest into those which will be included by the crop boundary and those which will be excluded by the crop boundary. Each such alternative division of regions of interest is then used to determine an inner crop boundary limit and an outer crop boundary limit such that the inner crop boundary limit is the smallest boundary which circumscribes the regions of interest to be included and the outer crop boundary limit is the largest boundary which excludes the regions of interest to be excluded. The one or more suitable crop boundaries can then be determined between the limits of the inner and outer crop boundary limits for each of said alternative divisions of regions of interest.

When the crop boundary has a plurality of edges and one or more suitable crop boundaries are determined by evaluating an edge quality metric for each possible edge placement between the inner and outer crop boundary limits, the selection of best crop boundary may at least in part be dependent on the separate edge quality metrics of each of the boundary's edges.

This can also help to reduce the computational burden, as it is then not necessary to consider alternative crops where the outer crop boundary limit does not completely enclose the inner crop boundary limit, or where the shape of the area between the outer and inner crop boundary limits does not permit the placement of the desired crop boundary shape.

It may be that in step (i) blank or uninteresting areas are detected as some of the features relevant to the composition and in steps (ii) and (iii) one or more of the compositional rules cause the image to be cropped according to the arrangement of said blank or uninteresting areas relative to other identified features relevant to the composition of the electronic image.

In photography, such blank areas are usually associated with a plain background, or sky. The image processing means can use one or more compositional rules associated with such blank areas. For example, a blank area extending across an upper horizontal band of the scene may be associated with plain sky, and so an appropriate compositional rule might be to minimise the amount of this particular area, and to orient horizontally the boundary between this area and lower areas of interest. Therefore, in general, the method may comprise the step of using the compositional rules to crop the captured image according to the arrangement of the blank areas relative to the other features which are not blank.

If the image is a colour image, it may be that at least one feature is identified by segmenting the image into areas of similar colour and/or texture.

A preferred way of processing the image to identify the or each feature relevant to the composition of the image comprises:

1) optionally resampling the image to a reduced number of pixels;
2) blurring the images; and
3) merging regions of similar appearance.

The blurring of the image has the effect of removing fine detail, thereby ensuring that insignificant areas of high contrast, for example sky through foliage, do not get given undue attention.

The "region merge" then groups adjacent sections of the image having similar appearance, for example similar colour, together. The merge is advantageously performed itteratively and a test may be performed at each itteration to identify the number of different regions within the image.

As part of this process small areas of colour surrounded by larger areas of similar colour or intensity may also be merged into the larger area.

Colours become clustered during the region merge. However, a further colour clustering step may be performed to reduce the number of colours.

The unusualness of the colour within the image may then be calculated and can be used to derive a "saliency image" which indicates how significant regions of the original image are. The saliency image represents an interest metric for regions of the image.

The term "interest metric" is used herein to define a weighting or importance attached to a particular area of interest. The interest metric for an identified feature may be used to associate with this feature at least one particular photographic compositional rule. For example a feature with a high interest metric may be associated with a rule that places such an area either at the centre of a cropped image, or slightly to one side of the centre of an image, for example according to the well-known photographic compositional rule called "the rule of thirds".

Advantageously the system, may also be capable of face detection, or person detection using one or more of: clothing recognition, face detection, hair colour and approximate style recognition, or use of body shape models.

Certain regions may be denoted as more salient than others by allocating high salience to regions on the basis of some combination of:

relative unusualness of the colour, intensity or texture of the region to other adjacent regions; and/or relative unusualness of the colour, intensity or texture of the region relative to a substantial portion of the image.

A decision may then be made by the image processor, software and/or firmware as to how likely the region is to be a person's face, head or whole body, or how likely the region is to be a known person or how central the region is in the image.

The system may also allow for interactive input from the user to indicate the prime region of interest.

The compositional rule for features identified at the centre of the image may be to include such features in the cropped image.

The invention will now be described by way of example only, with reference to the accompanying drawings, in which.

Figure 1:
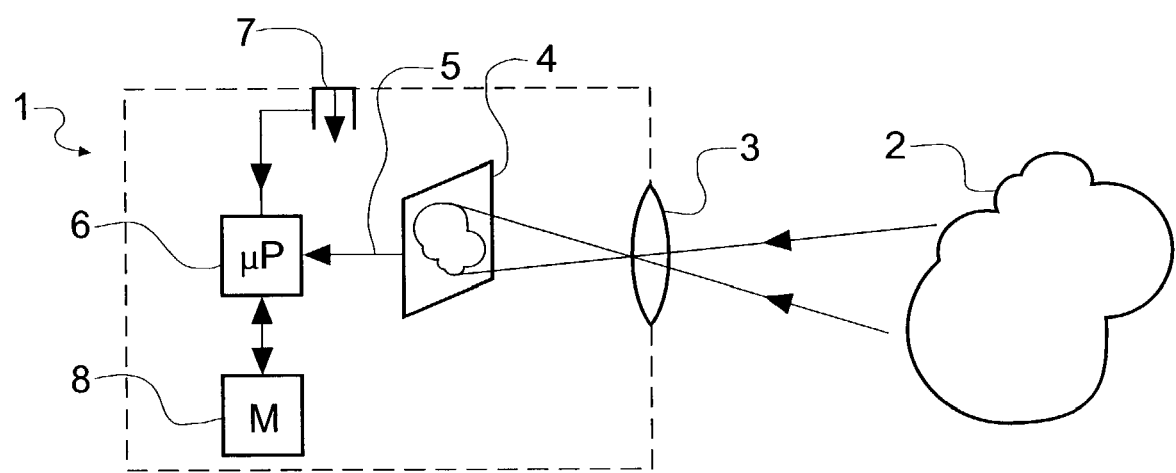
FIG. 1 is a block schematic view of an electronic camera system incorporating an electronic image processing device according to the invention, having a detector array and an image processor for automatically cropping electronic images captured by the detector array.

FIG. 1 shows schematically an electronic camera 1 for capturing an electronic image of a scene 2. The camera 1 has an optical imaging system 3 arranged to image the scene 2 onto a two-dimensional detector array 4 within the camera 1. The detector array 4 is connected 5 to a microprocessor 6 for processing of the images captured by the detector array 4. The microprocessor 6 has internal software and/or firmware for processing captured electronic images.

The microprocessor 6 is itself connected to an image capture button 7 by which a user of the camera 1 may initiate capture of the image, and also to a memory 8. Not shown are various items normally associated with a conventional electronic camera, namely a battery power supply, viewfinder or liquid crystal viewfinder display, focus and light level detection optics and electronics, and exposure and auto-focus control mechanisms.

Preferably, the processing of the captured image 10 is performed by the microprocessor 6 in the camera 1, with the memory 8 serving to hold data generated by the automatic cropping process, and the resultant cropped images. It would, however, be possible for image processing to be done external to a camera body, in which case the electronic camera and external processing form the electronic camera system of the invention.

The invention is particularly useful in the case of electronic cameras having a detector array 4 with a relatively large number of detector elements. For example, a detector array having two million or more elements can be used with an optical system 3 having a wide angle field of view. The user then need only point the electronic camera 1 generally in the direction of a scene 2 he wishes to photograph. Automatic cropping can then be used as described above to crop unwanted areas of the captured image. This relieves a considerable burden from the photographer, as he no longer needs to worry unduly about details of photographic composition. Electronic photographs can then be taken rapidly, which increases the chances that the photographer will capture the desired moment.

Figure 2A:
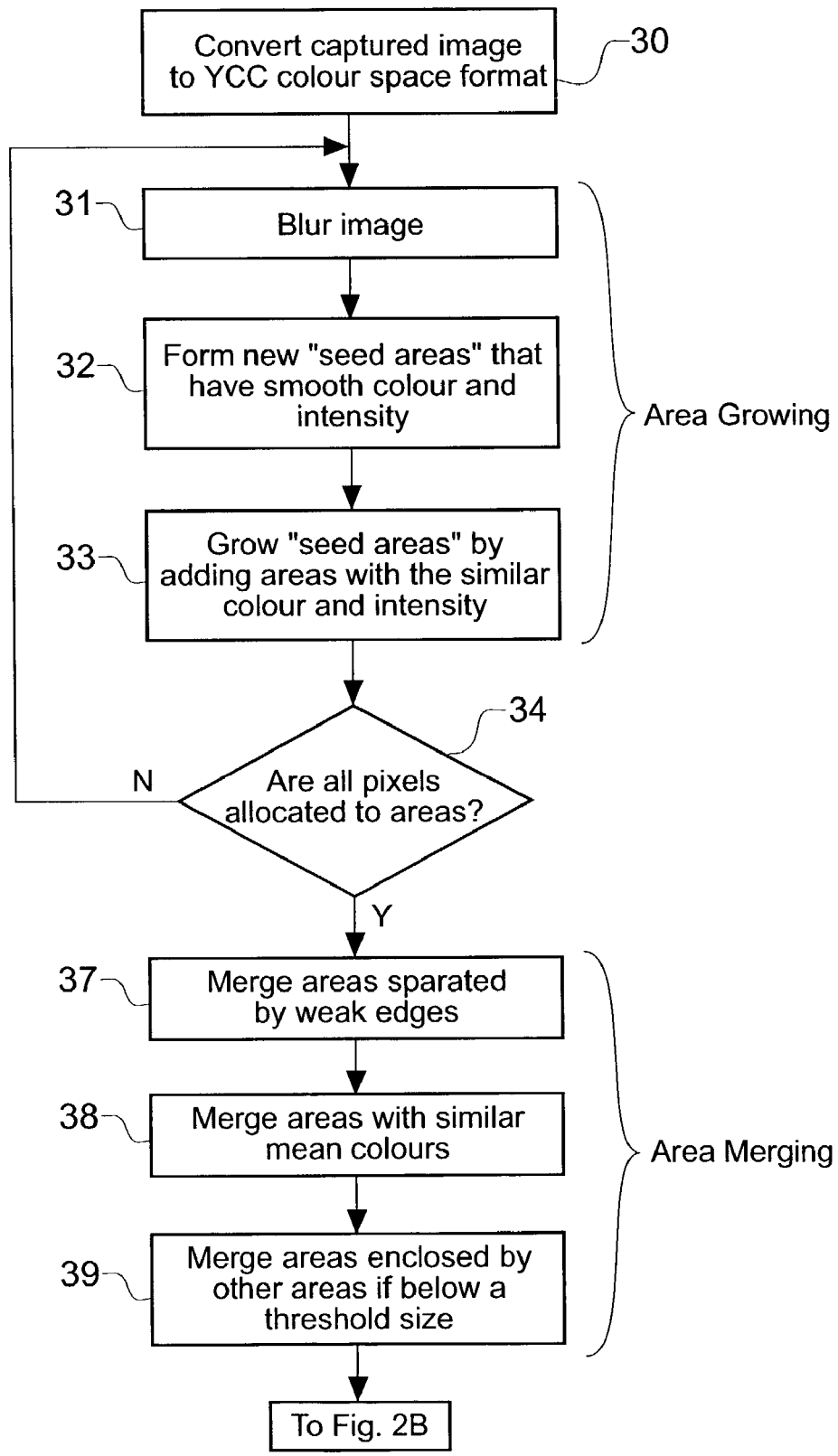
FIGS. 2A and 2B are flow charts illustrating an embodiment of a method according to the invention for cropping a captured electronic image.

An example of a method used for processing images in accordance with one embodiment of the present invention will be described with reference to FIGS. 2A and 2B. The various steps of the method, together with their results, can be seen with reference to FIGS. 3A to 3F.

Figure 3A:
FIGS. 3A to 3F show the processing steps obtained by following the method described with reference to FIGS. 2A and 2B.

FIG. 3A shows an image composed in a casual manner, perhaps by an inexperienced photographer or by someone who was rushing to try and capture the scene. The picture, generally indicated 10, shows a girl 12 on a swing. The girl 12 is reasonably well centred in the image and can be assumed to represent the main subject of the image. However, other potential regions of interest in the image include the flowers 14 located towards the bottom left hand corner of the image. On further inspection of the image it can be seen that a serious compositional error has been made by the inclusion of part of the figure of a person towards the right hand side of the image, and generally indicated 16.

An automated image processing system has no a-priori knowledge of the subject matter of the photograph and therefore needs to process it in order to extract some form of representation which will indicate where the compositionally significant regions of the photograph lie.

Figure 3B:
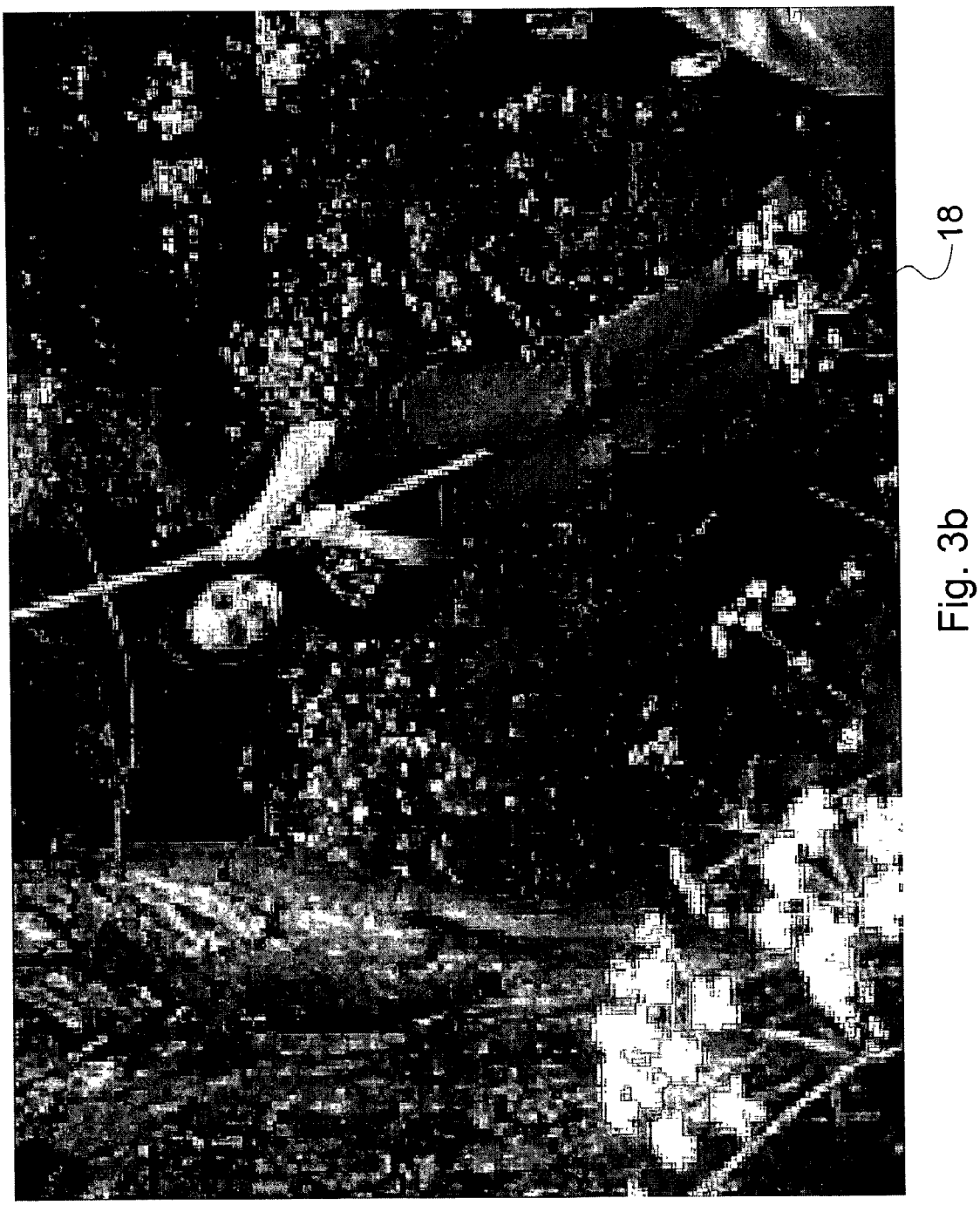

The photograph 10 may have been taken with a camera having in excess of 2,000,000 active pixels. Analysing such a large number of pixels would be computationally very significant indeed. Thus prior to performing any other processing stamps, the image processor down samples the image in order to reduce the number of pixels therein. FIG. 3B schematically illustrates the same image as shown in FIG. 3A, but after down sampling to 240 by 180 pixels. This down sampling has reduced the number of active pixels to 43,200. Following the down sampling, the down sampled image 18 is then converted at step 30 into an image having compressed colour variation whilst still retaining intensity variations. An example of such a processing is converting the image to the YCC colour space format. It should be noted that this is not the only colour space representation which could be used. Thus, the CIELAB colour space system can also be used. This system is well known, and defines a space in which the lightness L*, which is a measure of how bright a colour is plotted against the vertical axis, and two further measurements a* and b* are defined as linear axes with a* defining the colour from a red to green scale and the b* axis indicating colour on a blue to yellow scale. The measurements a* and b* are in the horizontal colour plane and are perpendicular to each other such that this colour system defines an orthogonal cartesian space. Each of the L*, a* and b* axis are defined in such a way that one unit on any of the scales has approximately the same "visibility" making this system both linear and isotropic as regards human perception. The L* axis has a scale from zero (black) to 100 (white) whilst the a* and b* scales range from −60 to +60 each. This system has the advantage that a colour difference of one unit has substantially the same visibility at any part of the colour space.

Following conversion of the image to a colour space, areas within the converted image having similar colour and intensity are generated and grown. This process commences at step 31 where the image is blurred, and then the blurred image is analysed at step 32 in order to form "seed areas" that have a smooth colour and intensity. The seed areas are then grown at step 33 by adding areas adjacent to the boundary of the seed areas where those adjacent areas have a sufficiently similar colour and intensity. From step 33, a test is made at step 34 to determine whether all of the pixels within the colour compressed image have been allocated to seed areas. If not, then control is passed from step 34 back to step 31 and the blur and region grow process is repeated in an iterative manner.

Figure 3C:

Eventually, the test at step 34 will be satisfied. FIG. 3C schematically illustrates the image 3B once all of the image has been blurred and assigned to regions. At this stage the image shown in FIG. 3C contains approximately 2,800 regions, some 2,200 of which contain 10 or less pixels.

Figure 3D:

The image processing then continues at step 37 by merging adjacent areas of the image which are separated by "weak edges". "Weak edges" are those boundaries that separate areas of the picture which have a relatively low colour or intensity differences. In other words, the regions are close to one another within the YCC or CIELAB space. From step 37, control is passed to step 38 where adjacent areas with similar mean colours are merged together. From step 38, control is then passed to step 39 which examines the image to determine if small areas, that is areas whose size is less than a threshold value, are completely enclosed by another larger area. If so, then the small area is merged into the larger area. Steps 37, 38 and 39 can be applied in a single pass. However, steps 37, 38 and 39 may be applied itteratively and a test may be made following step 39 to determine whether the number of individual regions has fallen to below a predetermined threshold number. If it is judged that there are still too many regions, then steps 37, 38 and 39 can be repeated, possibly with the definition of what constitutes a weak edge being changed such that the distance in the colour space by which colours must be separated before they are regarded as sufficiently different not to be merged may be increased. FIG. 3D shows the image following the region merging.

Figure 2B:
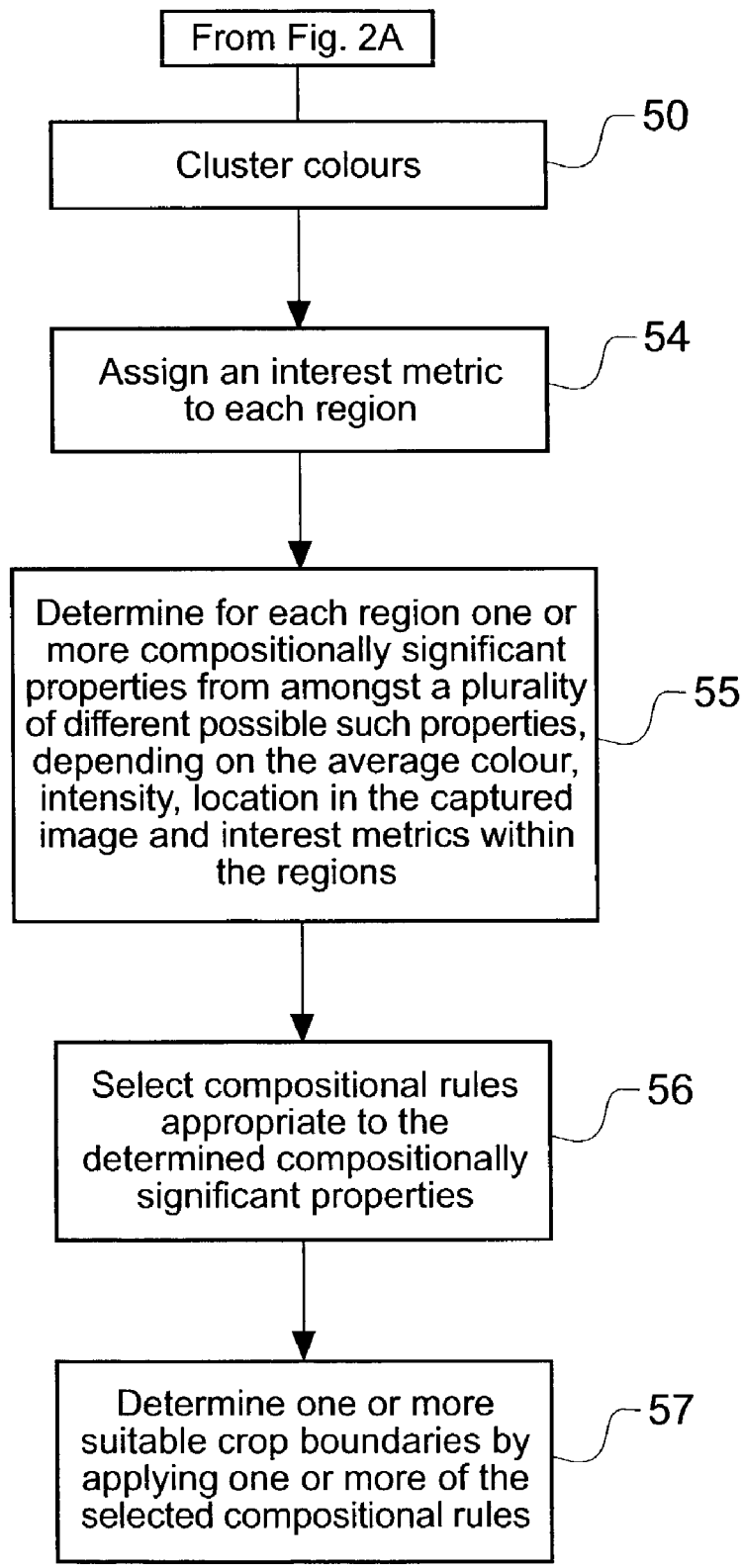

From step 39, control is passed to step 50, in FIG. 2B, where the image is further analysed in order to cluster similar colours together until such time as the number of colours has dropped to an appropriate number, which is typically in the region of 20 or so. The image of clustered colours is schematically illustrated in FIG. 3E.

It should be noted that as used herein a region is a spatially connected sub-area of the image. However a cluster is a collection of similar regions, but the regions do not need to be adjacent to one another.

Figure 3E:

It can be seem with reference to FIG. 3E that the main part of the flowers 14 have been merged into areas of uniform colour. Similarly, the girl's face has been merged into an area of uniform colour 51 as have her trousers 52. Large areas of the background have also been merged into areas of substantially uniform colour, for example the tree towards the left hand side of the image. From step 50, control is initially passed to step 54 where an interest metric is formed on the basis of the unusualness of the colour, and from there control is passed to step 55 where the image is analysed to determine the compositionally significant properties therein from amongst a plurality of different possible properties.

One such analysis that may be performed is the analysis of the clustered colours shown in FIG. 3E to determine how unusual they are. The image shown in FIG. 3E, as noted hereinbefore, comprises approximately 20 or so different colour clusters. These clusters are then sorted in order to identify how many pixels belong to each one of the colours.

Figure 4:
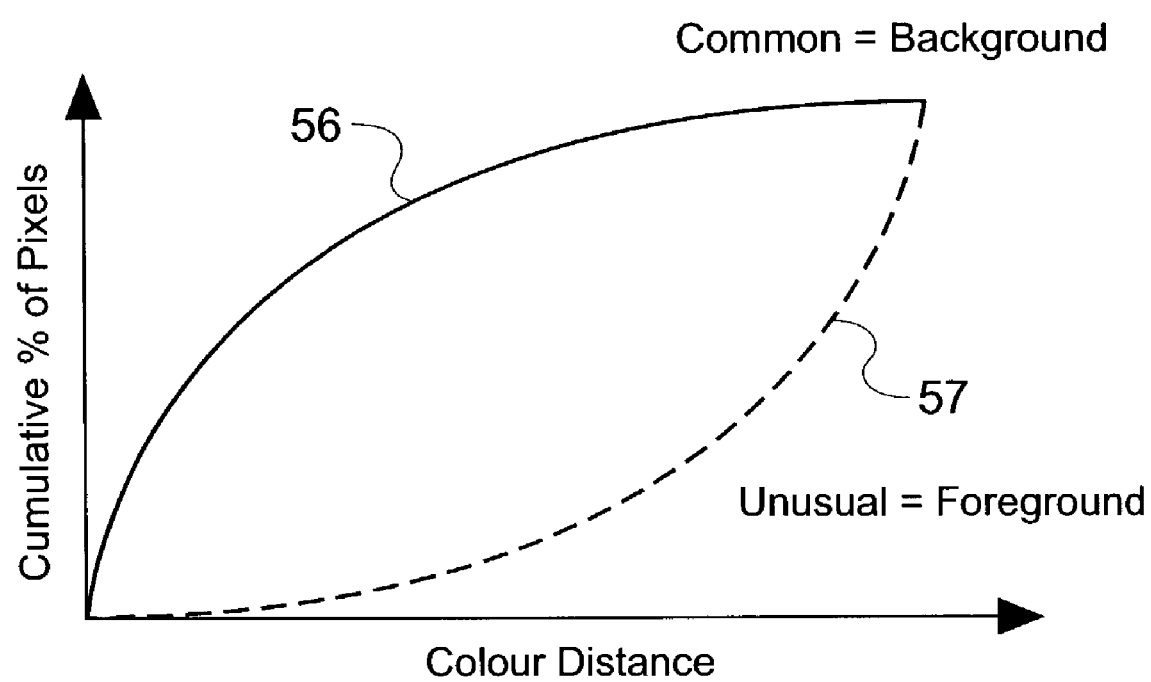
FIG. 4 shows a cumulative histogram of coloured pixels against increasing colour distance from a colour cluster under consideration.

FIG. 4 schematically illustrates a cumulative histogram of the percentage of pixels belonging to a colour against colour distance. Each of the colour clusters is processed in turn. When a colour is processed, the colour distance between it and each of the other colour clusters is calculated, the clusters are then sorted in order of colour distance from the colour cluster being processed. A cumulative histogram can then be formed for the colour cluster under test, by counting the cumulative sum of image pixels which are included in an increasing number of clusters along the colour distance dimension.

Clusters which, together with closely coloured neighbouring clusters, occupy a relatively large proportion of the pixels of the image are deemed to be background. The histogram for such a background colour cluster is denoted by line 56. Conversely, cluster colours which together with closely coloured neighbouring clusters occupy only a relatively small proportion of the pixels of the image are deemed to be foreground. A typical histogram shape for such a foreground colour is represented by line 57. By this analysis, cluster colours can be allocated a default saliency based on the likelihood that they are foreground colours.

However, colour mapping is not the only process that is applied in order to determine a saliency image. In general, those regions which are located towards the edges of the image may be penalised as they may belong to objects which are not fully in frame.

Further processes, such as pattern recognition may also be applied to the image. Thus, a search may be made to identify bodies or faces as a result of comparing areas within the image against models held within a model library.

Figure 3F:

FIG. 3F schematically illustrates a saliency image of FIG. 3A following the conclusion of the one or more processes performed in step 55.

The saliency image is processed to subdivide it into a small number of large areas (typically rectangles) which enclose the majority of the saliency in the images as shown in FIG. 5. Thus, the selected areas enclose the bright regions of the saliency image. One method of doing this is to form the sums of saliency pixel values along each row, and separately, down each column. Plotting these sums against the vertical and horizontal axes respectively, shows the vertical and horizontal distributions of saliency. These can then be analysed to find the widest minimum in either the vertical or horizontal saliency distribution. The image can then be split into three parts at this minimum. A first part comprises a horizontal, or as the case may be vertical, band through the image having a width substantially corresponding to that of the minimum. This part can be ignored as non salient. This will then leave two parts of the image each side of this minimum band which will contain saliency (except in the case where the minimum band is adjacent one of the edges of the image in which case there will only be one non-empty or salient side). These parts can each be processed by the same algorithm. The part with the widest minimum can be split in an analogous manner, discarding the width of the minimum and hence splitting that part into two smaller parts. This process can continue with each stage splitting the part about the best minimum until one of the following limiting conditions is reached:

i. No minimum can be found in any of the remaining parts. I.e. no minimum is found which is sufficiently wide and sufficiently low in saliency.
  ii. The function of the total saliency of the image which is outside of the retained block reaches some predetermined limit, such as 5%.

The result of this process is that a small set of rectangular blocks which enclose the major areas of saliency of the image are derived, as shown in FIG. 5.

Once features relevant to the composition of the image have been identified, that is up to and including step 56, the saliency map can now include regions of the image which are defined as include regions and exclude regions. Thus, considering FIG. 5A the girl has been identified as an "include" region and has been framed by a crop boundary 60 which represents the minimum boundary possible to include all of the girl therein. Similarly, the flowers have been identified as an include region and have been framed by a crop boundary 61 representing the minimum crop required to include the flowers. Furthermore, "must exclude" regions have been identified and enclosed by crop boundaries 64 and 66 respectively.

Having identified the minimum crop boundary, it is then advantageous to identify the maximum crop boundary. With regards to FIG. 5B, one potential maximum crop boundary 68 has been identified. This crop boundary abuts the must exclude regions 64 and 66, but also abuts the edge of the must include region 61. The boundary also extends between the upper and lower edges of the photograph. This crop boundary 68 represents the maximum crop boundary available to include the girl but to exclude the flowers. However, an alternative crop boundary is available which includes both the girl and the flowers. Thus, as shown in FIG. 5C a further minimum crop boundary 70 can be defined which includes both the girl and the flowers (with partial exclusion of the flowers being allowed because they are so close to the edge), and a further maximum crop boundary 72 has also been defined which extends to the upper and lower edges of the photograph, to the left hand edge, but abuts the must exclude regions 64 and 66 at the right hand edge thereof.

Figure 5B:
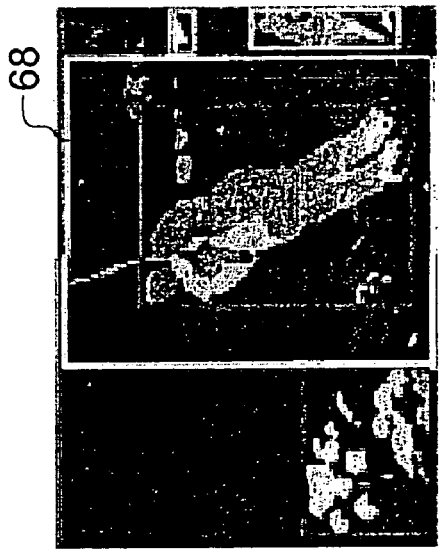
FIGS. 5A to 5C illustrate possible crop boundaries.
Figure 5C:
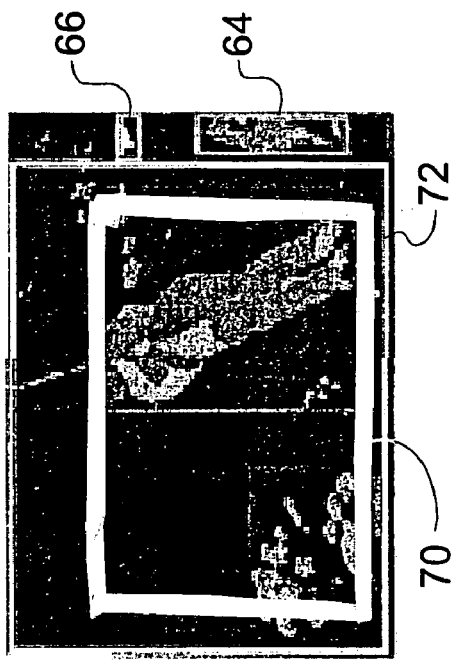
Figure 5A:
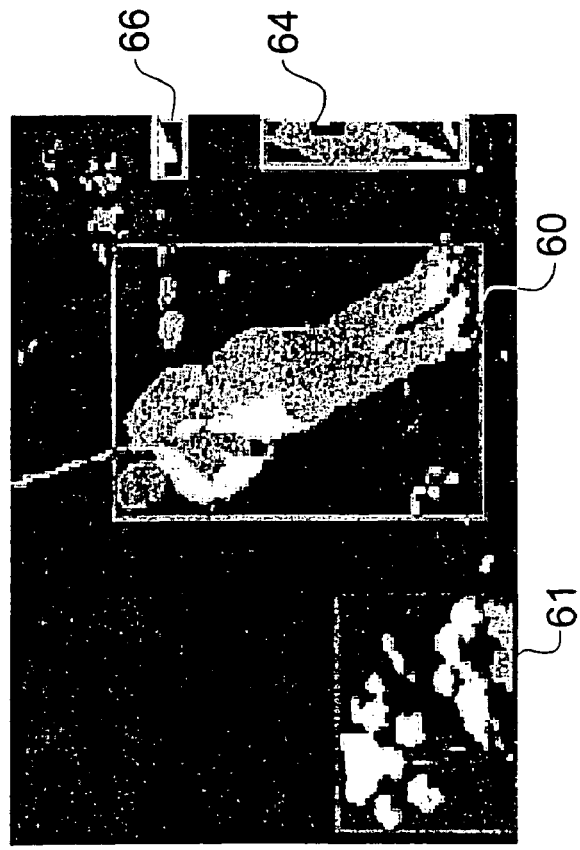
Figure 6A:
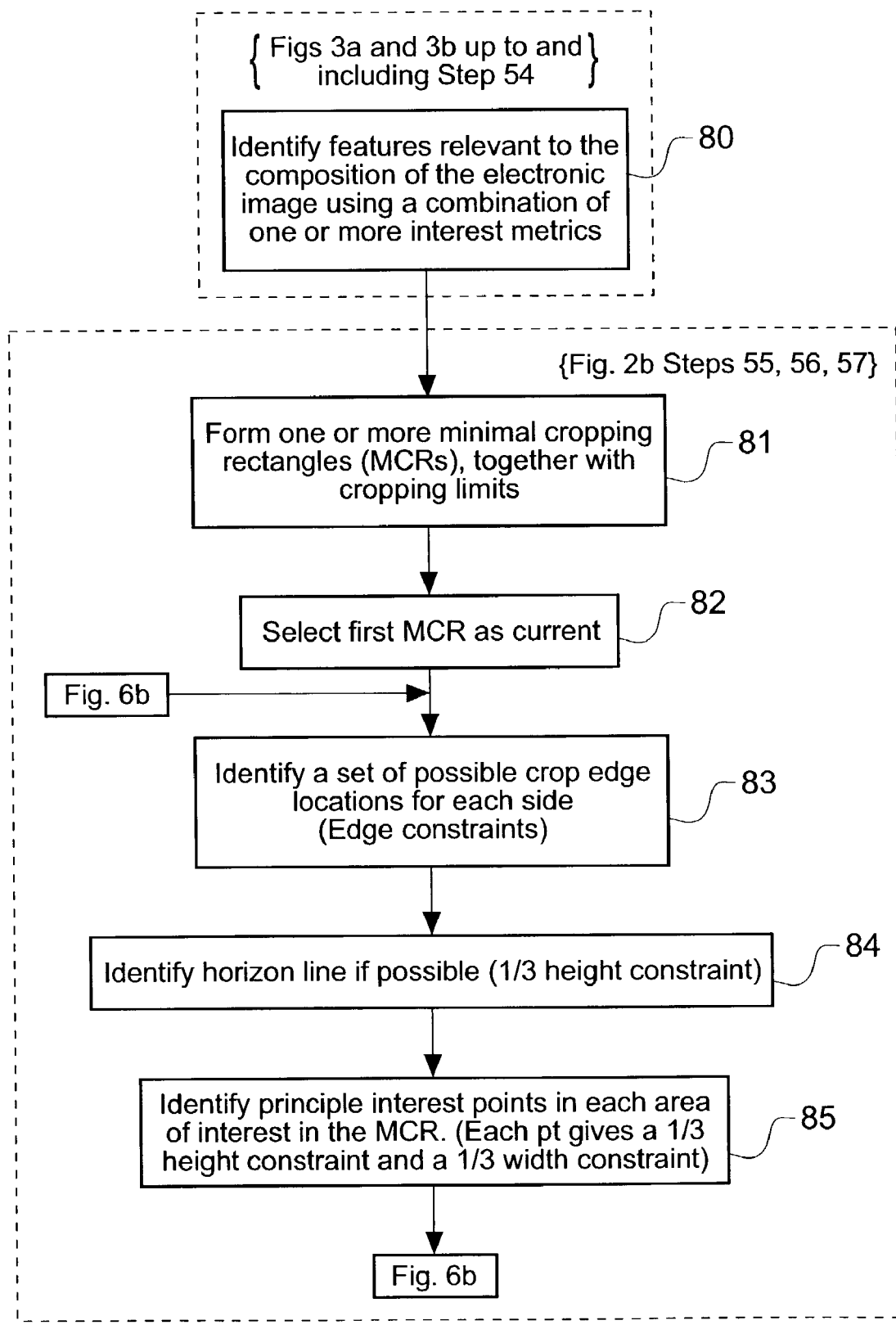
FIGS. 6A and 6B are flow charts showing in detail one way of implementing the method according to the invention as shown in FIGS. 2A and 2B.

Referring to FIG. 6A, control commences at step 80 where the saliency map is analysed in order to determine how many areas of interest exist therein. Thus, if the saliency map shows N distinct areas of interest (for example, areas of interest separated by some area of non-interest as determined by some adaptively set threshold), possible minimum cropping rectangles can be generated which contain alternative combinations of between 1 and N areas of interest where the minimum cropping rectangle contains a selected combination of areas of interest and excludes other areas as described in step 81. Thus this corresponds to generation of minimum cropping rectangle 60, 61 and 70 in FIGS. 5A and 5C. It should be noted that not all combinations may be possible as they may not be contained within a single rectangle that excludes one or more of the non-selected areas. The maximum cropping rectangle for the each single or combination of areas of interest is the maximum rectangle which contains the areas of interest but excludes the non-selected areas of interest. Thus, this corresponds to rectangles 68 and 72 in FIGS. 5B and 5C.

Each minimum cropping rectangle 60, 61 and 70 and its associated maximum cropping limit (of which only cropping limits 68 and 72 are shown in FIGS. 5B and 5C) is then processed in turn. However, some initial sorting may reduce the processing required. One of the compositional rules may require that a large well centred interesting area in the image is deemed to be essential. If we apply this rule then only minimum cropping boundaries 60 and 70 are permitted, with the flowers as defined by crop boundary 61 being excluded. The first step is to select a first one of the minimum cropping boundaries 60 and 70 as a potential cropping candidate, together with its cropping limits. This process is performed at step 82. From thereon, control is passed to step 83 which seeks to identify possible edge locations for each of the edges.

Figure 7:
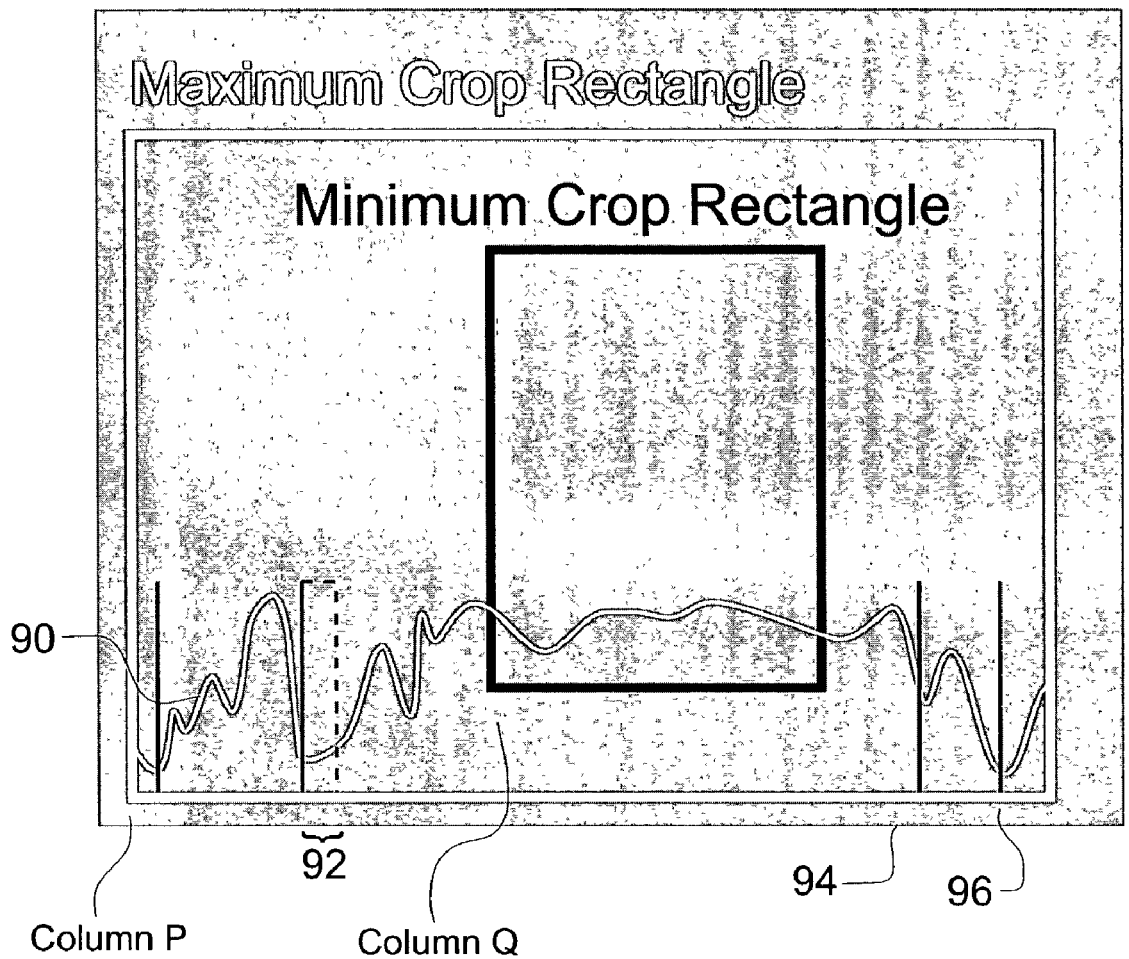
FIG. 7 is a plot of crop penalty metric against crop distance.

The procedure at step 83 is explained more fully with reference to FIG. 7. Supposing that minimum and maximum crop rectangles have been defined, and that it is now desired to find the position of suitable crop boundaries between the minimum and maximum limits. For the purpose of this description, we are going to locate the edge of one boundary, occurring to the left hand side of the minimum crop rectangle. Given that the digital image can be considered as consisting of a plurality of columns, the left hand edge of the maximum crop rectangle is located in column P, whereas the left hand edge of the minimum crop rectangle is located in column Q. Columns P and Q are not adjacent.

Sequentially each of the columns between P and Q is examined in turn in order to generate a metric of how good that column would be as a border of the cropping rectangle. Thus, the metric is constructed such that dark areas or slowly changing pixels along the column incur a low cost penalty, whereas brighter areas or alternatively rapidly changing colours in a row of pixels achieve a high penalty rating. Furthermore, the rating may also be modified with regards to the proximity of that column to the minimum and maximum crop boundaries, or indeed the proximity of that column to the edge of the picture.

In a preferred embodiment of the present invention, the edge quality metric is a function of:

a. Brightness. That is dark edges are preferred and hence incur only a low penalty.

b. Activity. That is the sum of the colour differences between regions crossed by a row or column is analysed, with low sums scoring a lower penalty.

c. saliency. That is the sum of the saliency values for pixels in the row or column is formed, with low saliency incurring a lower penalty.

d. Distance from strong colour transitions parallel to, and on the inside of, the column or row being tested. The distance should not be too close nor too far and a weighted distance term is used to accomplish this. This latter criteria is used to avoid cropping too close to a feature, even if it is not part of the minimum cropping rectangle.

These factors are independently smoothed and normalised before being combined in order to form a weighted sum to generate the edge quality metric as shown in FIG. 7.

Thus for each one of the individual columns, a penalty measurement is formed, and the penalty measurement can then be plotted with respect to column thereby obtaining a penalty measurement profile 90. The profile 90 can then be examined to determine the position of minima therein, such as broad minima 92 or the sharper minima 94 and 96 which are then deemed to be potential cropping boundaries. This process can be repeated for each of the left, right, bottom and top crop boundaries individually, and may be repeated on an iterative basis such that, for example, those pixels in the column which lie above the upper crop limit or below the lower crop limit are excluded from the next itteration of the crop boundary. These candidate crops can then be subject to further constraints. In practice, there will be too many constraints to satisfy all of the constraints simultaneously, steps 84 and 85 are given as examples of the implementation of some of the constraints which may be optionally utilised in the identification of crops from among the many candidate crops which may have been produced at step 83. Thus, at step 84, an attempt is made to identify a horizon line, and those crops which place the horizon from the edge of the candidate crop are favoured over those cropping possibilities that do not achieve this. Thus, this corresponds to the imposition of the "rule of thirds" in respect of the horizon line. Similarly, the "rule of thirds" can be introduced at step 85 to act on the main feature of interest to place it ⅓ of a distance from the edge of the crop.

Figure 6B:
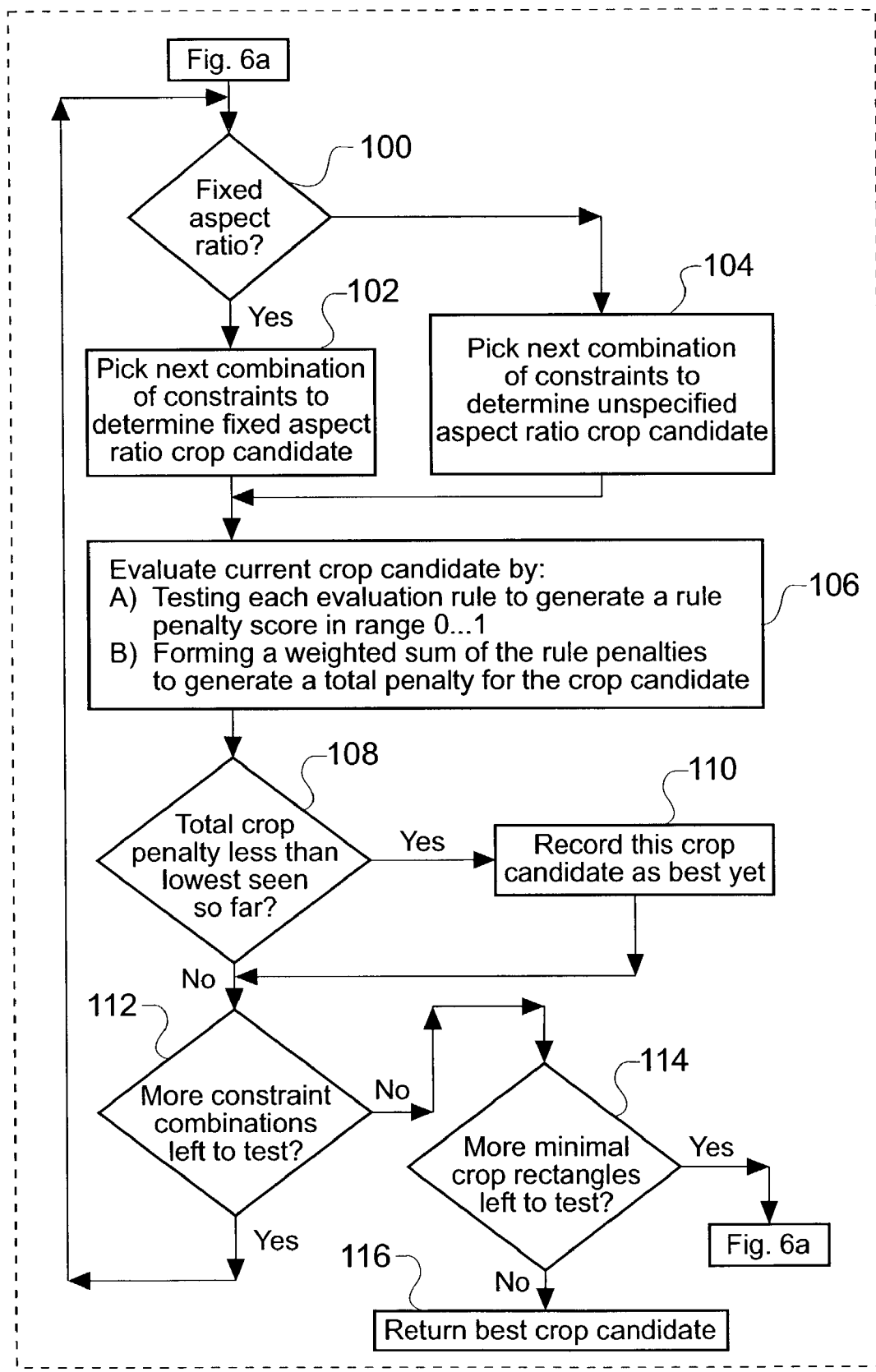

The final crop can also be constrained by the aspect ratio that the user has selected. FIG. 6B indicates the processing that may be implemented in order to select candidate crops based on their aspect ratio.

Control commences at step 100, where a question is asked as to whether or not the cropped image is to have a fixed aspect ratio. This ensures that it is possible that a particular aspect ratio can be specified and enforced. In practice this means that when an aspect ratio is specified (control passes to step 102), a smaller number of other constraints will in general be required to completely specify a crop candidate, than in the alternative case when no aspect ratio is required. In the case of no explicit aspect ratio requirement, it is likely that an evaluation rule in step 106 will penalize ridiculously thin aspect ratios.

Figure 8:
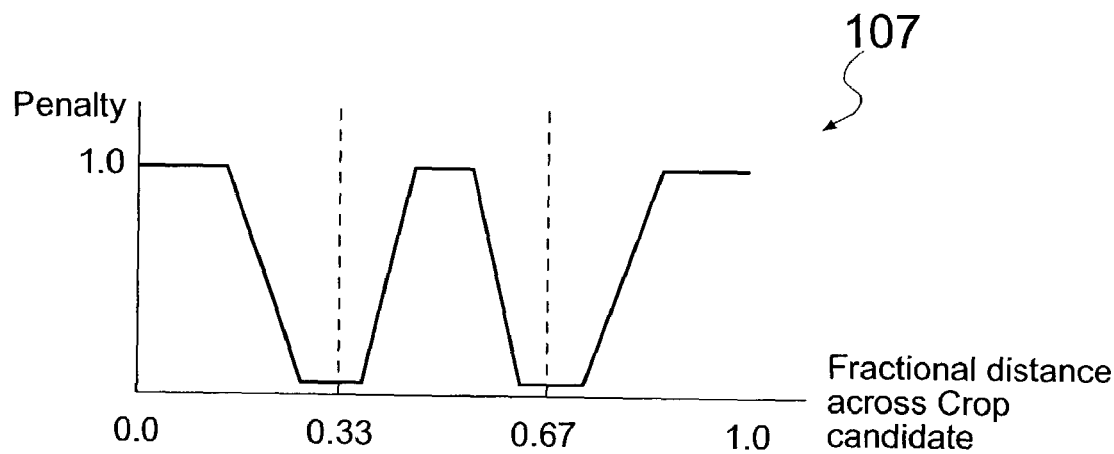
FIG. 8 is a plot of penalty metric versus position for alternative positions of a main region of interest.

Once a crop candidate has been identified, it is then evaluated at step 106 by applying one or more rules. Each rule is implemented as a heuristically evaluated measure on the image. For example, a metric 107 which measures how close a point of interest is from a one-third line is shown in FIG. 8. The fractional position of the point in the candidate crop is measured in both the horizontal and vertical directions. The penalty for each direction is determined from the heuristically determined graph shown in FIG. 8. The two measures $penalty_{vert}$ and $penalty_{horiz}$ are combined by the rule:

$$penalty = \max(penalty_{vert}, penalty_{horiz})$$

if $\max(penalty_{vert}, penalty_{horiz}) > 0.75$ and $$penalty = \mathrm{mean}(penalty_{vert}, penalty_{horiz})$$

if $\max(penalty_{vert}, penalty_{horiz}) = 0.75$

Similar heuristic measures are used for other compositional rules such as eliminating distractions close to the edge of the frame, minimum edge quality, a preference for dark or low activity boundaries, and so on.

The combination of different rule penalties by a weighted sum allows some rules to be considered as more important than others. Again, the weightings are determined heuristically.

There are many possible extensions of the basic scheme. For example, it would be possible for the rule combination weightings to be dynamically adjusted according to the overall type of image. For example, crop rectangle 60 with a single area of interest containing a single face looking straight towards the camera may reduce the weighting for the rule of thirds, allowing a more centrally placed portrait to be preferred.

Another possibility is for an additional penalty factor to be generated from step 81 where some crop rectangles are intrinsically preferred (i.e. given a low penalty) compared to others.

In FIG. 6B, the penalty is evaluated as follows. First, a test 108 is performed as to whether or not the total crop penalty is less than a lowest previous total crop penalty. If so, then the current crop candidate is recorded at step 110 as the best crop candidate so far. If not, then a test is performed at step 112 as to whether or not there are more constraint combinations left to test. If so, then the flowchart loops back to step 100.

If not, the flow chart next tests at step 114 if there are other minimal cropping rectangles left to test. If so, then the flow chart loops back to step 83. If not, the flow chart shows that the best crop candidate is returned at step 116 as an output from the process.

Figure 12A:
FIGS. 12a and 12b show examples of an automatically produced cropped images.
Figure 12B:

The idea behind FIGS. 6A and 6B is that all combinations of position are generated and then evaluated in the later steps. This is a "generate and test" approach to determining one or more suitable crop boundaries, using a "constraint set" determined by minimum and maximum cropping rectangles. FIGS. 12a and 12b illustrate examples of crops generated according to the present invention.

The cropping selection process may be modified, in an embodiment of the present invention, by giving the user the ability to "tag" an object such that it is included. One way of manually tagging features is to use the camera viewfinder as a pointing device (as opposed to its conventional use as both a pointing and composition device). In this use the prime area of interest is deliberately positioned in the approximate centre of the frame. When the image is auto-cropped according to this invention, the region at the centre of the image is deemed to be essential to the cropped image and is thus prevented from being cropped out.

In another variant of the invention, the camera may be initialised to identify certain colours or texture as having a high interest. At least two use models are possible here. One simply involves the identification of features of "natural" importance or inherent interest: faces, the overall shape of a person or object, and other expected compositional elements. Another is to provide additional elements or appendages for the specific purpose of "tagging" to force inclusion of an object in the cropped image. The practical effect may be similar in either case. For example, if a person is wearing a blue rain jacket, then the camera may be pointed close up at the blue rain jacket and then capture an image of the jacket. The camera can then be programmed to process a captured image to assign that particular colour a high interest metric. If a wide angle picture is then taken of a scene in which the blue jacket appears, then this area can be assigned the highest interest metric so that the captured image is automatically cropped in such a way that the blue jacket is retained in the image. This is particularly useful when images are captured of a crowd of people, one of which the photographer would like to make the main subject of the photograph.

Figure 10:
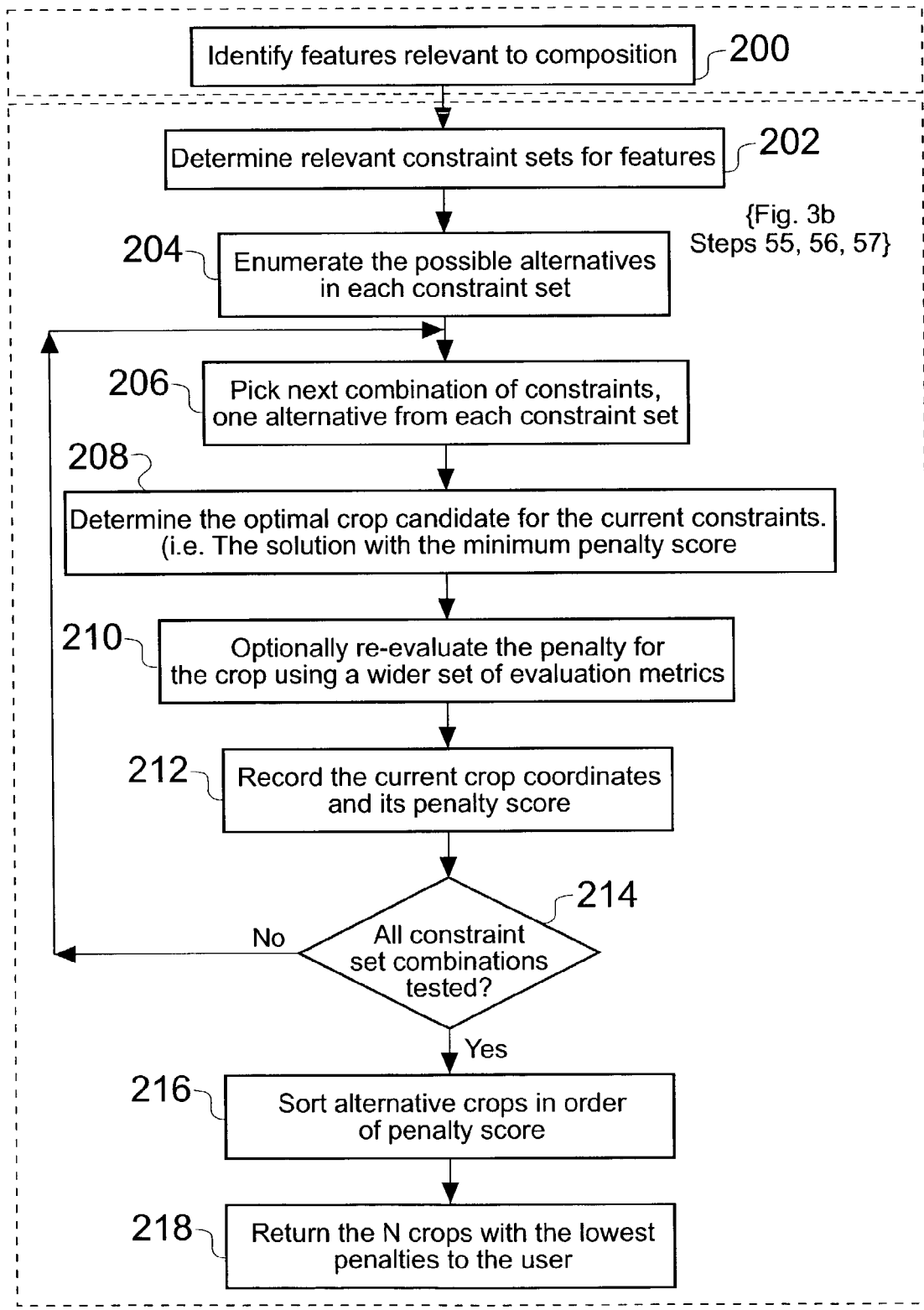
FIG. 10 is a flow chart showing in detail one way of implementing the method according to the invention as shown in FIGS. 2A and 2B, using a "constraint" based approach.
Figure 11:
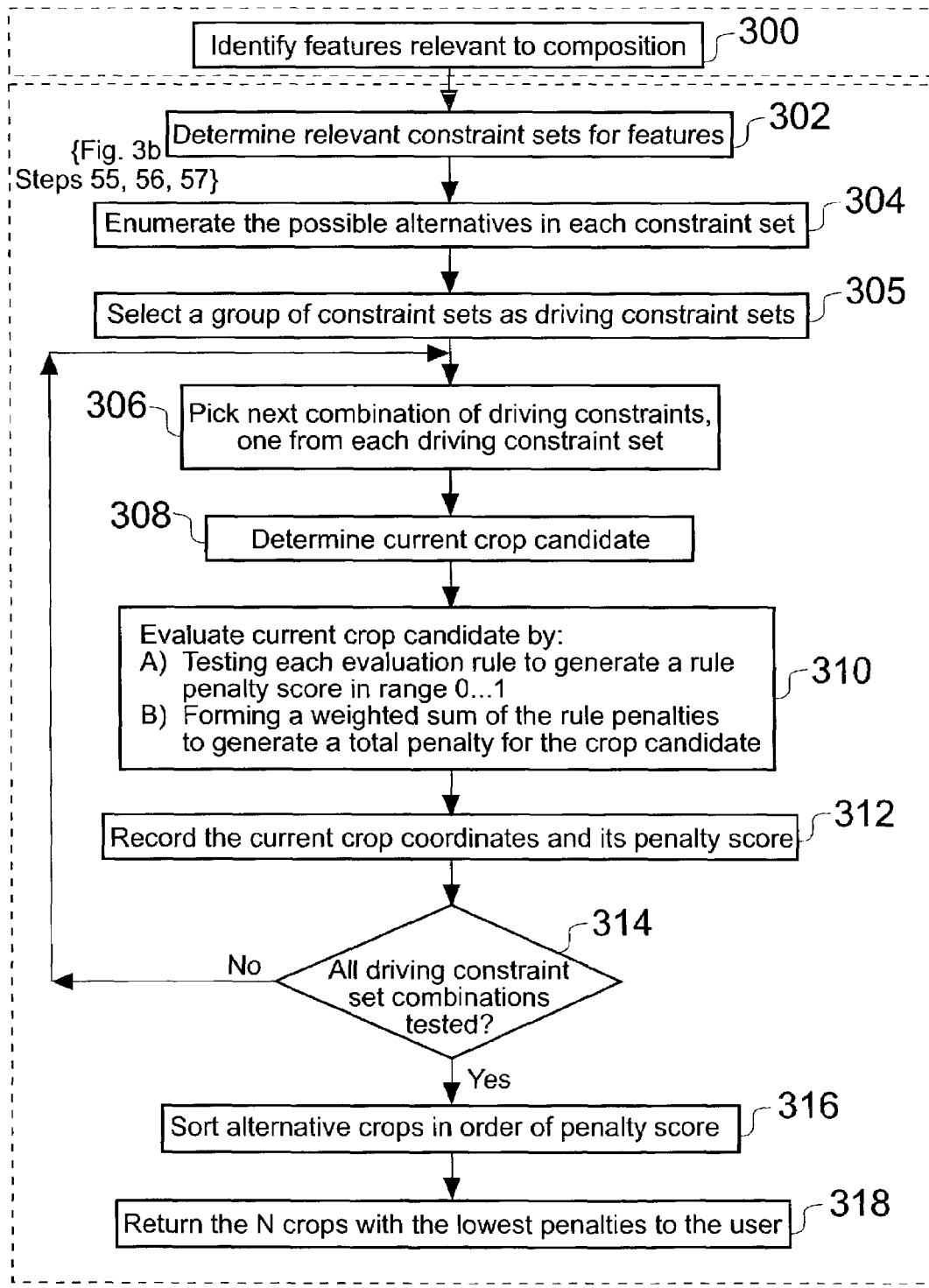
FIG. 11 is a flow chart showing in detail one way of implementing the method according to the invention as shown in FIGS. 2A and 2B, using a "generate and test" based approach.

FIGS. 10 and 11 show in more general terms the concepts behind respectively the "constraint-based" and "generate and test" approaches described above. In both cases, the starting point is the identification of features relevant to the composition of the image 200,300, for example as set out in the steps up to an including step 54 in FIG. 2B.

The next step 202 is to determine the relevant "constraint set" for the identified features. The concept of a "constraint set" is a set of alternatives, only one of which should be considered at a time. Each alternative consists of one or more fully specified constraints, for example features with some required value, which are then enumerated at step 204.

A simple example of a constraint set is "aspect ratio". There are two alternatives, "portrait" and "landscape". The first alternative (portrait) might be defined by the constraint:

(Right−Left)/(Bottom−Top)=0.75

The second alternative (landscape) might be defined by the constraint:

(Right−Left)/(Bottom−Top)=1.33

Figure 9:
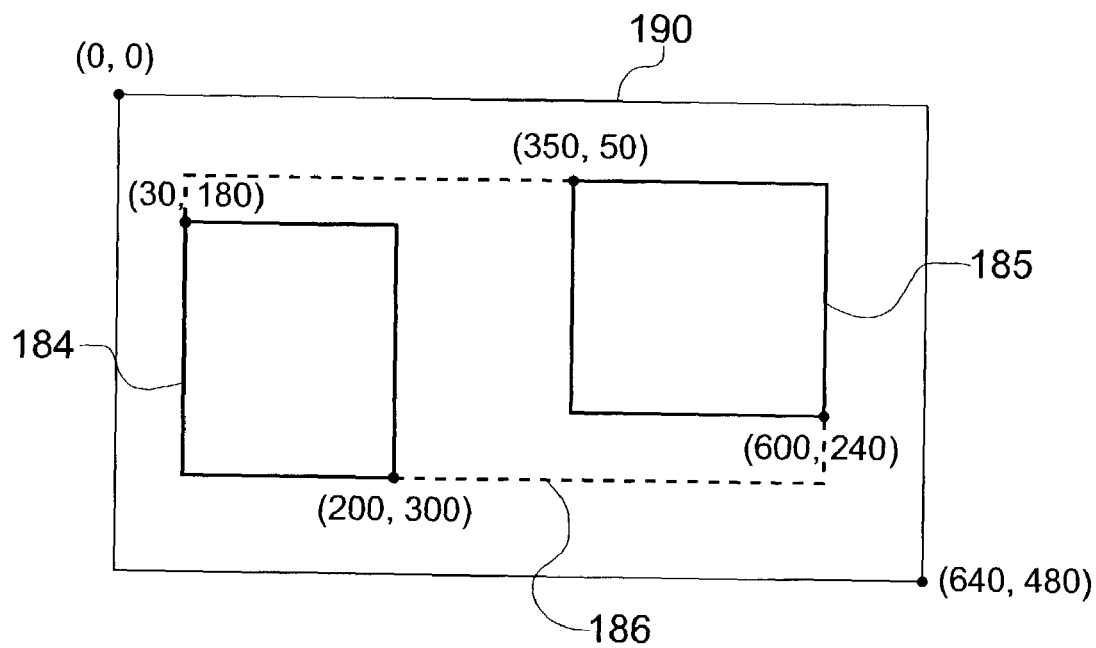
FIG. 9 shows schematically minimum and maximum cropping rectangles for two identified features.

With reference to FIG. 9, a more complex constraint set could define cropping limit alternatives for different groupings of areas of interest 184, 185 within the maximum boundary 190 of the original captured image. The number of alternatives in this set is determined by the analysis of the areas of interest in the image. Suppose that two areas of interest 184, 185 have been determined with pixel coordinates: (30,180) to (200, 300) and (350,50) to (600,240) as shown below. In this example, the whole image has a top left co-ordinate (0,0) and bottom right coordinate (640,480).

The crop limits constraint set would consist of three alternatives:

Alternative 1 (left-hand area of interest 184 only) is defined by the constraints:

Left>0 Left<30

Top>0 Top<180

Right>200 Right<350

Bottom>300 Bottom<480

Alternative 2 (right-hand area of interest 185 only) is defined by the constraints:

Left>200 Left<350

Top>0 Top<50

Right>600 Right<640

Bottom>240 Bottom<480

Alternative 3 (include both areas of interest 186) is defined by the constraints:

Left>0 Left<30

Top>0 Top<50

Right>600 Right<640

Bottom>300 Bottom<480

The constraint set concept can be used to represent many mutually exclusive sets of alternatives. Typical examples include: aspect ratio; alternative subject choices based on the minimal crop rectangle and maximal crop limits of various groupings of areas of interest; horizon placement alternatives (bottom third line or top third line); point of interest placement (at each of the four "one-third" intersection points or, for elongated items, along one of the four "one-third" lines); and preferred edge placements for top, bottom, left and right edges.

For each edge there is a constraint set consisting of alternative ranges of distances that are acceptable on the basis of an edge quality metric.

The examples given above are all "hard" constraints. That is, the condition must be met, and there is no gradual penalty involved in deviating from the condition. In many cases it is desirable to implement constraints as "soft", that is, incurring an increasing penalty the further away the solution moves from the local optimum. An example is that positioning a horizon line exactly on the one-third line is better implemented in a way that allows placement a little way off the precise one-third position, but penalises increasing distance from the desired one-third location.

The optimisation problem can easily be set to include this. For example by changing the condition:

$$x=\frac{1}{3}$$

to $$x+e1-e2=\frac{1}{3}$$

where e1 and e2 are positive penalty terms which contribute to an overall penalty function to be optimised, typically as a weighted sum of contributions such as . . .

$$penalty=c1e1+c2e2+\ldots$$

The next step 206 is to pick the next combination of constraints, one alternative from each constraint set. Many combinations can be immediately excluded or simplified as they are precluded by some of the other constraints. For example, choice of a particular cropping limits alternative will limit which points of interest can be considered as some may be outside those cropping limits.

The optimal crop candidate for the current constraints can then be determined at step 208. The constraints we have set up are combinations of simple linear conditions. These can be effectively solved by linear programming methods which find the location for top, bottom, left and right boundaries of the crop which meet all the hard constraints and satisfy the soft constraints in such a way that the overall penalty is minimised.

Depending on the precise set of constraint combinations being solved, there may be a number of situations. Ideally, there is a single optimal solution.

However, there may be no solution. This would be the case if some constraints were contradictory. For example, if there are two points of interest A and B where A is to the left of B, and a combination of constraints that attempts to place A near the right-hand one-third line and B near the left-hand one-third line, then there is clearly no solution. The method in step 206 of selecting sets of constraints to solve should ideally be implemented in such a way as to eliminate these situations.

There may be multiple solutions of equally low penalty score. In this case we have a number of alternatives. One is to pick a solution at random within the space of multiple solutions. Another is to tighten the constraints, for example by turning one or more soft constraints into hard constraints. Optionally, in step 210 it is possible to use a richer evaluation metric to generate a set of alternatives within the space of equally acceptable solutions and select these on the basis of the refined evaluation metric. This optional step may, for example, be a "generate and test" method. Many variants of this are possible.

The linear solution is a practical method that works well for automated cropping because constraint sets can be formed that represent alternative plausible choices. Treating each combination independently and hence finding different locally optimal solutions is a useful way of generating good alternatives for a user. Non-linear optimisation methods frequently suffer from problems with locally optimal solutions being confused for globally optimal solutions. An improved understanding of the search space allows this technique to circumvent such problems in a relatively intelligent manner.

Although linear programming is one method that may be used in step 208, it does impose limitations on the way the constraints are defined. Other optimisation techniques could be used within the same basic framework of local optimisation within a subspace defined by the choice of constraints from constraint sets.

If all possible constraints and evaluation criteria are encoded as hard or soft conditions which can be optimised in step 208, then step 210 may be bypassed. However, if step 208 is achieved by linear programming then some of the constraints may be poorly approximated or omitted. A more accurate evaluation of the solution generated by step 208 can be obtained afterwards in step 210. A more refined implementation might use the approximate solution from step 208 as the start point for a "generate and test" based local optimisation using the more detailed evaluation metrics.

An example of constraints that can be only approximated with a linear representation, is the edge quality metrics. The true edge quality can only really be assessed when the limits of the edge are known. For example, the true relative quality of alternative left edge locations is dependent on the top and bottom limits. A narrower choice of top and bottom may exclude features in the image that would otherwise adversely affect the left edge quality. This type of interdependency cannot be modelled with a linear system. The best that can be done is that within step 204, having selected minimum and maximum cropping limits, the edge quality metrics are recalculated using, for example, the maximum cropping limits, to generate a specific set of alternative constraints for each edge constraint set. These specific constraints are used while the particular choice of cropping limits is being considered.

Another type of constraint that cannot be modelled linearly is one involving ratios of areas in the image, for example, the relative area of a boring region within the crop boundary. Clearly, this will be nonlinear as the area is a multiplication of terms involving the horizontal and vertical crop locations.

In any event, once the crop candidate has been evaluated, this is recorded at step 212, along with its penalty score.

From step 212 control is passed to step 214 where a test is performed as to whether or not all constraint set combinations have been tested. If not, the flowchart loops back to step 206. If so, then there are many possibilities for deciding what to do with the results. FIG. 10 shows just one example, in which the crop candidates are sorted in order of penalty score at step 216, and then a number of these having the lowest penalty scores are presented at step 218 to a user of the system.

In addition to selecting from a set of alternatives, a user may wish to suggest improvements to the selected alternative. This could be achieved by simple commands such as "more" or "less". In such cases the system could define a new minimum crop rectangle and a new maximum crop limits, based on the selected crop and the alternatives which the user rejected. For example, if the user requested "more" then the selected crop becomes the new minimum crop rectangle and the smallest non-selected crop which exceeds the size of the selected crop becomes the new maximum crop limit. The system can then re-consider alternative edge placements within these limits to generate a new set of alternatives to present to the user. Repeated use of this form of interaction can allow the user to interactively explore the space of alternatives which best meet the system's criteria for compositionally acceptable crops.

An example of another approach would be to ensure that one from each of the possible alternative crop limits was used.

In some applications of the invention, a user may not be involved, and the crop may be fully automatic.

FIG. 11 is a general example of a "generate and test" method, in which certain constraints are defined as hard, equality constraints and are used to define a crop candidate without any attempt at optimisation. Each hard constraint is a local optimum location for a particular criterion.

For ease of comparison, steps in FIG. 11 that correspond with those in FIG. 10 are given a reference numeral incremented by 100.

Once the relevant constraint sets for the features have been determined 300, these are enumerated at 304, and a group of constraint sets is selected at 305 as "driving constraint sets". These constraint sets are such that when groups of constraints are formed, one from each driving constraint set, a crop candidate is fully specified.

A simple example is for the group of driving constraints to consist of the constraint sets for top, bottom, left and right locations, where each of these constraints is a candidate edge position determined from the edge quality metric.

So, for example, the left edge constraint set might be:

Left=5

Left=38

Left=150

Analogous constraint sets would exist for possible Right, Top and Bottom candidates.

In the example discussed above, the driving constraints are edge constraints such as these, combined with the cropping limits for various combinations of areas of interest (i.e. minimum crop rectangles and cropping limits).

An alternative group of driving constraint sets might be three enumerated edge location constraint sets and an aspect ratio constraint set.

The driving constraint sets determine which out of all possible crop rectangles are "generated". In the least intelligent possible implementation, all possible left, right, top and bottom locations are generated. This, however, increases computational effort.

In step 306, the next combination of driving constraints is selected, one from each driving constraint set.

The determination of the current crop candidate in step 308 is trivial, as there is only one possible solution to the driving constraints by definition.

In step 310, all soft constraints are evaluated. Here, an unspecified collection of soft evaluation criteria are combined.

Once the crop candidate has been evaluated, this is recorded at step 312, along with its penalty score.

Then a test is performed at step 314 as to whether or not all driving constraint set combinations have been tested. If not, the flowchart loops back to step 306. The flowchart only loops round the driving constraints as these fully specify the candidate crop rectangles to be considered.

If all driving constraint sets have been evaluated, then there are many possibilities for deciding what to do with the results. FIG. 11 shows just one example, in which the crop candidates are sorted in order of penalty score at step 316, and then a number of these having the lowest penalty scores are presented to a user of the system at step 318.

The invention provides various advantages in automating or semi-automating the capture of cropped images with improved selection and composition of subject matter. The invention also reduces the effort on the part of the photographer to take photographs with good and appropriate composition, thereby matching the potential of an electronic camera to capture a large number of images quickly.

It is thus possible to provide a method of and apparatus for analysing an image which:

a. Implements a set of metrics computed from features of the image, each embodying a compositional rule;

b. Utilises dynamic decision mechanisms which decide which of the compositional rules are appropriate for a given image on the basis of the content of the image; and c. Incorporates a mechanism which optimises the position of the crop boundary in accordance with the appropriate compositional rules.

A large number of compositional rules can be implemented under the scheme, a non-limiting and non-exhaustive list of which includes:

Identifying distractions which should be excluded from the scene.

Identifying boring areas which should be reduced in size.

Identifying a horizon line and ensuring that it is not placed centrally or close to the top or bottom of the image.

Identifying important subjects and arranging their placement in the output crop. This may, for example involve use of the well known "rule of thirds".

Identifying multiple possible subjects and generating alternate crops containing different combinations of subjects.

Identifying the approximate direction in which one or more persons is or are looking, and, seeking to provide more space on the side of the image that the or each person is facing. This rule may not be satisfied if two or more people are facing in different directions.

Ensuring that boundaries form natural frames where possible, for example by selecting relatively dark inactive areas in the image as areas in which to place boundaries.

Ensuring that strongly contrasting edges are not placed at or close to the edge of the frame.

Ensuring that thin objects pointing towards the edge of the frame are either completely in the frame, with some background border, or alternatively are decisively cropped. Examples of such objects include outstretched arms or church spires.

Ensuring that people are cropped, if necessary, at points which are known to be pleasing. This typically avoids cropping at joints such as ankles, waists, elbows or the kneck.

Constraining the aspect ratio of output crops to be within a range of generally accepted conventional proportions, optionally which may be fixed to a desired aspect ratio.

In practice, not every rule applies to every image. Furthermore, some rules may be contradictory and hence may be combined in a weighted manner in order to define a potential crop incurring the least penalty under the rules. However this invention provides a set of implemented rules which are tested against the image to see if, and where, they are relevant. A single rule may be applied multiple times at the same image; for example removing a number of distractions. This is an aspect of the invention which contrasts with the currently known art in which typically only one rule is used to isolate a single subject area and place this centrally within a frame or within some relatively small fixed size border.

It should also be noted that, because a plurality of compositional rules are implemented, it is typically not possible to fully satisfy all the compositional rules which apply to an image simultaneously. A means is therefore required to identify and form one or more relatively good compromises. The present invention allows that some or all of the rules which are found to apply to an image can be automatically formulated as constraints. Various automated methods are then possible to find locally optimal ways of satisfying a set of conflicting constraints. Another significant and important feature of the invention is that each alternative local optimisation may itself be a suitable crop result. This contrasts with the prior art. Thus the present invention is able to generate a small number of alternative crops from which a user can select.

In specific implementation of the invention described hereinabove, compositional rules were embodied in a number of key features of the processing steps. In particular:
i. Saliency map generation, wherein rules for identifying areas likely to attract the attention of a human viewer were applied.
ii. Rules for the identification and elimination of distractions at the edge of the images when forming the maximum cropping limits.
iii. Rules for identifying different combinations of subjects for alternative compositions.
iv. Generation of edge quality metrics, including rules for selecting locations appropriate for provision of the cropping edge locations.
v. Forming a weighted sum combination of crop quality metrics and implementing rules for comparatively assessing alternative possible output crops.

The person skilled in the art will, of course, ascertain from the above teachings that the general principles of this invention lend themselves to alternative implementations.

The invention claimed is:

1. An electronic image processor for cropping an electronic image, the image processor adapted to:
a) process the electronic image to identify one or more features relevant to the composition of the electronic image;
b) select at least one compositional rule from a plurality of predetermined compositional rules, based on the relevance of the compositional rule(s) to one or more of the identified features;
c) determine one or more suitable crop boundaries by applying the selected compositional rules;
d) generate a number of crop candidates corresponding to said crop boundaries;
e) generate minimum and maximum crop limits for each of the crop candidates;
f) evaluate suitable candidate crop boundaries between the minimum and maximum crop limits by generating a measure of quality for each candidate crop boundary in accordance with at least one quality metric; and
g) select a reduced number of crop candidates as output candidates based on the measure of quality generated in the evaluating step.

2. An electronic image processor as claimed in claim 1, wherein the image processor includes at least one of firmware and software for processing an image.

3. An electronic image processor as claimed in claim 1 wherein the processor is arranged to analyse the image in order to produce a saliency map.

4. An electronic image processor as claimed in claim 3, wherein the image comprises a plurality of pixels and the image processor is arranged to cluster similar pixels in the image into regions and the regions are analysed to determine a measure of unusualness within the image.

5. An electronic image processor as claimed in claim 4, in which regions which are unusual are rated as more salient than regions which occur more commonly.

6. An electronic image processor as claimed in claim 3, wherein the image processor searches the image for shapes which according to a predetermined rule are regarded as relevant features, such features including faces of people.

7. An electronic image processor as claimed in claim 3, wherein the image processor searches the image for shapes which according to a predetermined rule are regarded as relevant features, such features including tagged objects.

8. An electronic camera system for capturing an electronic image of a scene, comprising, a detector array for capturing the electronic image, an optical imaging system arranged to image the scene onto the detector array, and an image processor for cropping the captured image, wherein the image processor is as claimed in claim 1.

9. An electronic camera as claimed in claim 8, in which the camera includes means by which a user of the camera may tag one or more features relevant to the composition of the electronic image, said tagged feature(s) then being associated with a compositional rule that includes said tagged feature(s) in the cropped image.

10. An electronic image processor as claimed in claim 1, wherein the minimum crop limit for a respective crop candidate corresponds to a first rectangular region that encompasses a region in the electronic image that includes all of a particular contiguous feature, and the maximum crop limit for the respective crop candidate corresponds to a second rectangular region that encompasses the first rectangular region and that abuts respective minimum crop limits of other crop candidates that correspond to adjacently positioned regions in the electronic image and that respectively include all of other particular contiguous features.

11. An electronic image processor method, comprising:
processing an electronic image to identify compositionally significant features within the image,
sorting the compositionally significant features according to at least one compositional rule into those features which are to be included within cropped versions of the image and those features which are to be excluded from cropped versions of the image,
automatically generating a plurality of candidate crops based on the sorted compositionally significant features, wherein each of the candidate crops is not merely the smallest crop that encloses a feature which is to be included,
generating minimum and maximum crop limits for each of the candidate crops, identifying suitable crop candidate boundaries between the minimum and maximum crop limits for each of the candidate crops, by generating a measure of quality in accordance with at least one quality metric, and selecting a reduced number of crop candidates as output candidates based on the measure of quality generated in the identifying step.

12. An electronic image processor as claimed in claim 11, wherein suitable crop boundaries are identified by applying a plurality of constraints to the image, the constraints generated from at least one compositional rule.

13. An electronic image processor method as claimed in claim 11, wherein the minimum crop limit for a respective crop candidate corresponds to a first rectangular region that encompasses a region in the electronic image that includes all of a particular contiguous feature, and the maximum crop limit for the respective crop candidate corresponds to a second rectangular region that encompasses the first rectangular region and that abuts respective minimum crop limits of other crop candidates that correspond to adjacently positioned regions in the electronic image and that respectively include all of other particular contiguous features.

14. An electronic image processor, comprising:
   an analyzer unit configured to analyse an image to identify compositionally significant features therein;
   a compositional rule application unit configured to apply at least one composition rule so as to generate a plurality of constraints;
   a candidate crop generation unit configured to apply the constraints to the image to generate a plurality of minimum and maximum candidate crops each one having a measurement associated therewith indicating the extent to which the constraints are violated;
   an identifying unit configured to identify suitable crop candidate boundaries between the minimum and maximum crop limits for each of the candidate crops, by generating a measure of quality in accordance with at least one quality metric; and
   a presenting unit configured to present at least one of the candidate crops to a user, in accordance with the generated measure of quality.

15. An electronic image processor as claimed in claim 14, wherein the minimum crop limit for a respective crop candidate corresponds to a first rectangular region that encompasses a region in the electronic image that includes all of a particular contiguous feature, and the maximum crop limit for the respective crop candidate corresponds to a second rectangular region that encompasses the first rectangular region and that abuts respective minimum crop limits of other crop candidates that correspond to adjacently positioned regions in the electronic image and that respectively include all of other particular contiguous features.

16. A method of using an electronic image processing device for cropping an electronic image, the image processing device comprising an image processing means, the image processing means including at least one of an electronic processor, firmware and software for processing the electronic image, wherein the method comprises the steps of using the image processing means to:
   i) process the electronic image to identify at least one feature relevant to the composition of the electronic image each such feature occupying a sub-region of the electronic image;
   ii) select at least one compositional rule from a set comprising a plurality of predetermined compositional rules, based on the relevance of the compositional rule(s) to at least one of the identified features; and
   iii) determine at least one suitable crop boundary for a plurality of crop candidates by applying one or more of the selected compositional rules,
in which:
   step (i) includes identifying features which constitute non-overlapping segmented regions of interest;
   step (iii) is achieved by first selecting alternative divisions of said identified regions of interest into those which will be included by the crop boundary and those which will be excluded by the crop boundary;
   each such alternative division of regions of interest is used to determine an inner crop boundary limit and an outer crop boundary limit such that the inner crop boundary limit is the smallest boundary which circumscribes the regions of interest to be included and the outer crop boundary limit is the largest boundary which excludes the regions of interest to be excluded; and
   said one or more suitable crop boundaries are determined between the limits of the inner and outer crop boundary limits for each of said alternative divisions of regions of interest.

17. A method as claimed in claim 16, in which each identified feature has at least one compositionally significant property from amongst a plurality of different predetermined compositional properties, and at least one compositional rule is selected from a set of predetermined compositional rules, based on the relevance of the compositional rule(s) to the compositionally significant properties of one or more of the identified features.

18. A method as claimed in claim 16, in which step (iii) comprises the steps of:
   iv) generating a plurality of alternative candidate crop boundaries for each of the plurality of crop candidates, the alternative candidate crop boundaries including minimum and maximum crop boundaries;
   v) generating a measure of composition quality for each alternative minimum and maximum candidate crop boundary by using a set of picture composition metrics; and
   vi) selecting a reduced number of crop candidates having a relatively high measure of composition quality.

19. A method as claimed in claim 18, in which only one crop candidate is selected.

20. A method as claimed in claim 18, wherein the minimum crop boundary for a respective crop candidate corresponds to a first rectangular region that encompasses a region in the electronic image that includes all of a particular contiguous feature, and the maximum crop boundary for the respective crop candidate corresponds to a second rectangular region that encompasses the first rectangular region and that abuts respective minimum crop limits of other crop candidates that correspond to adjacently positioned regions in the electronic image and that respectively include all of other particular contiguous features.

21. A method as claimed in claim 16, in which step (iii) comprises the steps of:
   vii) implementing the compositional rules as constraints that may be satisfied to a greater or lesser degree, each constraint having an associated cost function that increases the less well the constraint is satisfied;
   viii) defining an overall cost metric as a function of crop coordinates in the image, by forming a combination of the separate cost functions associated with each individual constraint;

ix) applying an optimisation method to find at least one best crop locations by finding minima in the overall cost metric; and x) selecting as output a reduced number of crop candidates for said best crop locations.

22. A method as claimed in claim 21, in which only one crop candidate is selected.

23. A method as claimed in claim 16, in which the crop boundary of the cropped image has a plurality of crop edges, and the steps of the method are performed separately for each crop edge to generate the crop boundary.

24. A method as claimed in claim 16 in which said inner crop boundary limit and said outer crop boundary limit has a plurality of edges and one or more suitable crop boundaries are determined by evaluating an edge quality metric for each possible edge placement between the inner and outer crop boundary limits, the selection of best crop boundary being at least in part dependent on the separate edge quality metrics of each of the boundary's edges, each possible edge placement corresponding to a particular pixel row or pixel column in the electronic image.

25. A method as claimed in claim 16, in which one or more of said suitable crop boundaries are presented to a user of the device for manual selection by the user for cropping of the electronic image.

26. A method as claimed in claim 17, in which in step (i) blank or uninteresting areas are detected as some of the features relevant to the composition and in steps (ii) and (iii) one or more of the compositional rules cause the image to be cropped according to the arrangement of said blank or uninteresting areas relative to other identified features relevant to the composition of the electronic image.

27. A method as claimed in claim 16, in which the image is a colour image and at least one feature is identified by segmenting the image into areas of similar colour and/or texture.

28. A method as claimed in claim 16, in which in step (i) features relevant to the composition of the electronic image are identified by a process of:
   segmenting the image into regions;
   denoting certain regions as more salient than others;
   grouping salient regions into larger regions separated by relatively non-salient regions;
   identifying said groups of salient regions as features with a region of interest property.

29. A method as claimed in claim 28, in which the image is segmented into regions by segmenting the image into homogenous sub-areas, the measure of homogeneity being based on some combination of colour, intensity and texture.

30. A method as claimed in claim 28, in which certain regions are denoted as more salient than others by allocating high salience to regions on the basis of at least one of:
   relative unusualness of at least one of the colour, intensity and texture of the region to other adjacent regions; and/or
   relative unusualness of at least one of the colour, intensity and texture of the region relative to a substantial portion of the image.

31. A method as claimed in claim 16, in which the compositional rule for features identified at the centre of the image is to include such features in the cropped image.

32. A method as claimed in claim 16, further comprising a step (0) prior to step (i) of determining, independently of capture of the electronic image, specific features or objects of interest, and wherein step (i) further comprises attempted identification of said specific features or objects of interest and designation of successfully identified specific features or objects of interest as features relevant to the composition of the electronic image.

33. A method as claimed in claim 32, wherein step (0) comprises identification of specific features or objects prior to capture of the electronic image.

34. A method as claimed in claim 32, wherein step (0) comprises provision of at least one identifier tag and of rules for identification of identifier tags, and wherein step (i) comprises use of said rules for identification of said identifier tags.

35. A method as claimed in claim 34, wherein said identifier tags are infra-red transmitters.

36. A method of cropping an electronic image, comprising the steps of:
   i) processing the image to identify at least one distinct feature within the image,
   ii) selecting at least two compositional rules relevant to the at least one feature, the compositional rules determining the possible inclusion and placement of the feature within a cropped version of the image;
   iii) determining at least one minimum and at least one maximum crop boundary for a cropped version of the image in accordance with the selected compositional rules; and
   iv) determining an appropriate crop boundary between the minimum and maximum crop boundary for the image, based on at least one of: a) lowest brightness level as compared to adjacent regions, b) smallest color activity as compared to adjacent regions, and c) lowest saliency as compared to adjacent regions, the appropriate crop boundary corresponding to a particular column of the image, the adjacent regions corresponding to left and right columns of the image abutting the particular column.

37. A method as claimed in claim 36, in which the selected compositional rules are used to define a set of constraints, and then candidate crop boundaries are determined in accordance with the constraints.

38. A method as claimed in claim 37, in which the constraints are implemented as soft constraints, such that the degree of non compliance with each constraint is used to form a penalty measurement.

39. A method as claimed in claim 38, in which the crop with the lowest penalty associated therewith is selected for presentation to a user.

40. A method as claimed in claim 39, in which a user can impose their choices into the compositional rules.

41. A method as claimed in claim 36, wherein the minimum crop boundary for a respective crop candidate corresponds to a first rectangular region that encompasses a region in the electronic image that includes all of a particular contiguous feature, and the maximum crop boundary for the respective crop candidate corresponds to a second rectangular region that encompasses the first rectangular region and that abuts respective minimum crop limits of other crop candidates that correspond to adjacently positioned regions in the electronic image and that respectively include all of other particular contiguous features.

* * * * *